(12) United States Patent
Komada

(10) Patent No.: US 10,281,832 B2
(45) Date of Patent: May 7, 2019

(54) POSITIVELY CHARGEABLE TONER

(71) Applicant: KYOCERA Document Solutions Inc., Osaka (JP)

(72) Inventor: Ryotaro Komada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/962,118

(22) Filed: Apr. 25, 2018

(65) Prior Publication Data

US 2018/0314174 A1    Nov. 1, 2018

(30) Foreign Application Priority Data

Apr. 27, 2017   (JP) ................. 2017-088401

(51) Int. Cl.

| | |
|---|---|
| *G03G 9/097* | (2006.01) |
| *G03G 9/08* | (2006.01) |
| *G03G 9/093* | (2006.01) |
| *C08F 212/08* | (2006.01) |
| *C08L 25/14* | (2006.01) |
| *C08L 33/10* | (2006.01) |

(52) U.S. Cl.
CPC ......... *G03G 9/0823* (2013.01); *C08F 212/08* (2013.01); *G03G 9/0975* (2013.01); *G03G 9/09321* (2013.01); *G03G 9/09371* (2013.01); *G03G 9/09708* (2013.01); *G03G 9/09741* (2013.01); *C08L 25/14* (2013.01); *C08L 33/10* (2013.01); *C08L 2312/00* (2013.01)

(58) Field of Classification Search
CPC ..................... G03G 9/09741; G03G 9/0975
See application file for complete search history.

(56) References Cited

U.S. PATENT DOCUMENTS

| | | | |
|---|---|---|---|
| 9,703,217 B1 * | 7/2017 | Morales-Tirado | ... G03G 9/0835 |
| 2010/0232850 A1 * | 9/2010 | Koido | ................ G03G 21/0058 399/357 |

FOREIGN PATENT DOCUMENTS

JP     2004-240158 A    8/2004

* cited by examiner

*Primary Examiner* — Peter L Vajda
(74) *Attorney, Agent, or Firm* — Studebaker & Brackett PC

(57) ABSTRACT

A positively chargeable toner includes toner particles each including a toner mother particle and an external additive adhering to a surface of the toner mother particle. The external additive includes first resin particles each having a surface to which a cationic surfactant adheres and second resin particles each having a surface to which an anionic surfactant adheres. Respective number average primary particle diameters of the first resin particles and the second resin particles are at least 60 nm and no greater than 100 nm. A detachment ratio of the first resin particles in a dispersion of the toner subjected to five-minute ultrasonic treatment is no greater than 20% in terms of a peak intensity percentage in a fluorescent X-ray spectrum plotted for the dispersion of the toner. A detachment ratio of the second resin particles in the dispersion is at least 30% and no greater than 60% in terms thereof.

11 Claims, No Drawings

POSITIVELY CHARGEABLE TONER

INCORPORATION BY REFERENCE

The present application claims priority under 35 U.S.C. § 119 to Japanese Patent Application No. 2017-088401, filed on Apr. 27, 2017. The contents of this application are incorporated herein by reference in their entirety.

BACKGROUND

The present disclosure relates to a positively chargeable toner.

A toner has been known that includes toner mother particles containing at least a binder resin and a colorant and each having a surface to which at least negatively chargeable resin fine particles and positively chargeable inorganic fine particles adhere.

SUMMARY

A positively chargeable toner according to the present disclosure includes a plurality of toner particles each including a toner mother particle and an external additive adhering to a surface of the toner mother particle. The external additive includes first resin particles each having a surface to which a cationic surfactant adheres and second resin particles each having a surface to which an anionic surfactant adheres. Respective number average primary particle diameters of the first resin particles and the second resin particles are at least 60 nm and no greater than 100 nm. A detachment ratio of the first resin particles in a dispersion of the positively chargeable toner subjected to five-minute ultrasonic treatment is no greater than 20% in terms of a peak intensity percentage in a fluorescent X-ray spectrum plotted for the dispersion of the positively chargeable toner. A detachment ratio of the second resin particles in the dispersion of the positively chargeable toner subjected to the five-minute ultrasonic treatment is at least 30% and no greater than 60% in terms of a peak intensity percentage in a fluorescent X-ray spectrum plotted for the dispersion of the positively chargeable toner.

DETAILED DESCRIPTION

The following describes an embodiment of the present disclosure. Note that unless otherwise stated, results (for example, values indicating shapes or properties) of evaluations performed on particles (specifically, toner cores, toner mother particles, external additive, toner, or carrier) are number averages of measurements made with respect to an appropriate number of the particles.

Unless otherwise stated, the number average particle diameter of particles is a number average value of equivalent circle diameters of primary particles (Heywood diameters: diameters of circles having the same areas as projected areas of the particles) measured using a microscope. Values for volume median diameter ($D_{50}$) of particles are values measured using a laser diffraction/light scattering-type particle size distribution analyzer ("LA-750", product by HORIBA, Ltd.) unless otherwise stated.

Chargeability refers to chargeability in triboelectric charging unless otherwise stated. Positive chargeability (or negative chargeability) in triboelectric charging can be determined using a known triboelectric series or the like.

The term "-based" may be appended to the name of a chemical compound in order to form a generic name encompassing both the chemical compound itself and derivatives thereof. Also, when the term "-based" is appended to the name of a chemical compound used in the name of a polymer, the term indicates that a repeating unit of the polymer originates from the chemical compound or a derivative thereof. In the present description, the term "(meth)acryl" is used as a generic term for both acryl and methacryl. Also, the term "(meth)acrylonitrile" is used as a generic term for both acrylonitrile and methacrylonitrile.

In the following description, the term "silica particles" refers to both non-treated silica particles and silica particles (surface-treated silica particles) obtained by surface treatment on a silica base (non-treated silica particles). Silica particles rendered positively chargeable by surface treatment may be referred to as "positively chargeable silica particles". Also, the term "titanium oxide particles" refers to any of non-treated titanium oxide particles (also referred to below as a titanium oxide base), titanium oxide particles (surface-treated titanium oxide particles) obtained by surface treatment on a titanium oxide base, and titanium oxide particles each having a conductive layer on a surface thereof. Titanium oxide particles obtained by coating a titanium oxide base with a conductive layer (titanium oxide particles rendered electrically conductive with their coat layers) may be referred to as "conductive titanium oxide particles".

The toner according to the present embodiment is a positively chargeable toner. The positively chargeable toner includes a plurality of toner particles (particles each having later-described features). The toner according to the present embodiment can be favorably used for development of electrostatic latent images. The toner may be used as a one-component developer. Alternatively, a two-component developer may be prepared by mixing the toner and a carrier using a mixer (for example, a ball mill). A ferrite carrier (ferrite particles) is an example of a carrier suitable for image formation. In order to achieve high quality image formation over an extended period of time, magnetic carrier particles including carrier cores and resin layers coating the carrier cores are preferably used. In order to ensure sufficient chargeability of the carrier for the toner for an extended time period of time, it is preferable that the resin layers fully cover the surfaces of the carrier cores (that is, there is no surface region of each carrier core that is exposed through the resin layer). In order that carrier particles are magnetic, carrier cores thereof may be formed from a magnetic material (for example, a ferromagnetic material such as ferrite) or a resin in which magnetic particles are dispersed. Alternatively, magnetic particles may be dispersed in the resin layers covering the carrier cores. Examples of resins that can constitute the resin layers include at least one resin selected from the group consisting of fluororesins (specific examples include perfluoroalkoxy alkane (PFA) and fluorinated ethylene propylene copolymer (FEP)), polyimide-imide resins, silicone resins, urethane resins, epoxy resins, and phenolic resins. Preferably, the amount of the toner in a two-component developer is at least 5 parts by mass and no greater than 15 parts by mass relative to 100 parts by mass of a carrier in order to achieve high quality image formation. The carrier preferably has a number average primary particle diameter of at least 20 μm and no greater than 120 μm. Note that a positively chargeable toner contained in a two-component developer is positively charged by friction against a carrier therein.

The toner according to the present embodiment can for example be used for image formation using an electrophotographic apparatus (image forming apparatus). The following describes an example of image forming methods that are performed by electrophotographic apparatuses.

First, an image forming section (e.g., a charger and a light exposure device) of an electrophotographic apparatus forms an electrostatic latent image on a photosensitive member (for example, on a surface portion of a photosensitive drum) based on image data. Next, a developing device (specifically, a developing device having a toner-containing developer loaded therein) of the electrophotographic apparatus supplies the toner to the photosensitive member to develop the electrostatic latent image formed on the photosensitive member. The toner is charged by friction with a carrier, a development sleeve, or a blade in the developing device before being supplied to the photosensitive member. A positively chargeable toner is positively charged. In a development process as above, the toner (specifically, the toner charged) on the development sleeve (for example, a surface portion of a development roller in the developing device) disposed in the vicinity of the photosensitive member is supplied to the photosensitive member and caused to adhere to an irradiated portion of the electrostatic latent image on the photosensitive member, so that a toner image is formed on the photosensitive member. Toner in an amount corresponding to the amount of the toner consumed in the development process is supplied to the developing device from a toner container containing toner for replenishment use.

Subsequently, in a transfer process, a transfer device of the electrophotographic apparatus transfers the toner image on the photosensitive member onto an intermediate transfer member (e.g., a transfer belt), and then further transfers the toner image on the intermediate transfer member onto a recording medium (e.g., paper). Thereafter, a fixing device (fixing method: nip fixing with a heating roller and a pressure roller) of the electrophotographic apparatus fixes the toner to the recording medium by applying heat and pressure to the toner. As a result, an image is formed on the recording medium. A full-color image can for example be formed by superimposing toner images of four different colors: black, yellow, magenta, and cyan. Toner remaining on the photosensitive member after the transfer process is removed by a cleaning member (e.g., a cleaning blade). A direct transfer process may alternatively be employed, which involves direct transfer of the toner image on the photosensitive member to the recording medium without use of the intermediate transfer member. A belt fixing method may be employed as a fixing method.

The toner according to the present embodiment is a positively chargeable toner having the following features (also referred to below as basic features).

(Basic Features of Toner)

The toner includes a plurality of toner particles each including a toner mother particle and an external additive adhering to a surface of the toner mother particle. The external additive includes first resin particles each having a surface to which a cationic surfactant adheres (also referred to below simply as first resin particles) and second resin particles each having a surface to which an anionic surfactant adheres (also referred to below simply as second resin particles). Respective number average primary particle diameters of the first resin particles and the second resin particles are at least 60 nm and no greater than 100 nm. A detachment ratio of the first resin particles in a dispersion of the toner subjected to five-minute ultrasonic treatment is no greater than 20% in terms of a peak intensity percentage in a fluorescent X-ray spectrum plotted for the dispersion of the toner and a detachment ratio of the second resin particles in the dispersion of the toner subjected to the five-minute ultrasonic treatment is at least 30% and no greater than 60% in terms of a peak intensity percentage in a fluorescent X-ray spectrum plotted for the dispersion of the toner. The peak intensity percentage in the fluorescent X-ray spectrum plotted for the dispersion of the toner subjected to the five-minute ultrasonic treatment, which indicates the detachment ratio of the first resin particles in the dispersion of the toner, will be hereinafter referred to as a "first resin detachment ratio". Also, the peak intensity percentage in the fluorescent X-ray spectrum plotted for the dispersion of the toner subjected to the five-minute ultrasonic treatment, which indicates the detachment ratio of the second resin particles in the dispersion of the toner, will be hereinafter referred to as a "second resin detachment ratio".

In the aforementioned basic features, a smaller first resin detachment ratio indicates greater fixation strength of the first resin particles against the toner mother particles (that is, stronger connection of the first resin particles to the toner mother particles). Also, a smaller second resin detachment ratio indicates greater fixation strength of the second resin particles against the toner mother particles (that is, stronger connection of the second resin particles to the toner mother particles).

Toner remaining on a photosensitive drum is removed together with other extraneous matter on the photosensitive drum by cleaning after the transfer process in a typical image forming apparatus. For example, extraneous matter on the photosensitive drum is scraped and removed by rubbing the surface of the photosensitive drum with an edge of a cleaning blade in a blade cleaning method.

When resin particles (an external additive) are caused to adhere to the surfaces of toner mother particles, thermal-stress resistance of a toner can be increased. In order to ensure sufficient thermal-stress resistance of the toner by causing the resin particles to function as spacers among toner particles, the resin particles preferably have a number average primary particle diameter of at least 60 nm and no greater than 100 nm. However, the present inventor found that use of resin particles as an external additive of toner particles involves the following problems. In order to solve the problems, the present inventor invented the positively chargeable toner having the aforementioned basic features.

It is comparatively easy to adjust only the initial chargeability of a toner within a desired range by a typical design scheme for a toner (specifically, selection of a binder resin and an external additive, adjustment of the amount of the external additive, and the like). However, it is not easy to prevent degradation of chargeability of the toner that is accompanied by long time use of the toner. For example, a positively chargeable toner is stirred for use in a developing device in a typical image forming apparatus. In a configuration in which toner particles of a toner are rendered positively chargeable through use of an external additive, positive chargeability of the toner is impaired when the external additive is detached from the toner particles by being stirred with a result that the toner tends to be insufficiently charged. For the reason as above, positive chargeability of a positively chargeable toner tends to be impaired as time elapses from start of use of the toner.

Furthermore, in a configuration in which toner mother particles (toner cores in a configuration in which later-described capsule toner mother particles are used) that melt at low temperature are used, an external additive tends to be embedded in the toner mother particles (or the toner cores) due to thermal stress. When the external additive is embedded, chargeability of the toner tends to vary.

The external additive of the toner having the aforementioned basic features includes the first resin particles (first resin particles having surfaces to which a cationic surfactant adheres) and the second resin particles (second resin particles having surfaces to which an anionic surfactant adheres). The present inventor found that when a cationic surfactant or an anionic surfactant is caused to adhere to surfaces of resin particles, chargeability of the resin particles can be easily adjusted. When a cationic surfactant is caused to adhere to the surfaces of the resin particles, positive chargeability of the resin particles can be increased. When an anionic surfactant is caused to adhere to the surfaces of the resin particles, negative chargeability of the resin particles can be increased.

For example, when a polymerization reaction for forming the first resin particles (polymerization of a resin raw material) is caused in a liquid containing a material of the first resin particles (resin raw material) and a cationic surfactant and the first resin particles taken out from the liquid are not washed (or the cationic surfactant present on the surfaces of the first resin particles is not thoroughly removed in a washing process), the cationic surfactant can be present on the surfaces of the first resin particles. The cationic surfactant adheres to the surfaces of the first resin particles. When the first resin particles are changed to the second resin particles and the cationic surfactant is changed to an anionic surfactant in the above-described method, the anionic surfactant can be present on the surfaces of the second resin particles.

A nonionic surfactant may adhere to the surfaces of either or both the first resin particles and the second resin particles in addition. The nonionic surfactant has insignificant influence on chargeability of resin particles when compared to the cationic surfactant and the anionic surfactant. That is, even when the nonionic surfactant adheres to the surfaces of the resin particles, chargeability of the resin particles varies not so significantly. As described above, when a cationic surfactant or an anionic surfactant is caused to adhere to the surfaces of the resin particles, chargeability of the resin particles can be adjusted. However, use of only the cationic surfactant (or the anionic surfactant) in production of the resin particles may invite insufficient dispersibility of the resin particles or a material thereof (resin raw material). In such a situation, sufficient dispersibility of the resin particles or the material thereof (resin raw material) can be easily ensured by adding the nonionic surfactant in addition to the cationic surfactant or the anionic surfactant.

When a positively chargeable external additive is detached from the toner particles, positive chargeability of the toner decreases and the toner tends to be insufficiently charged. When a negatively chargeable external additive is embedded in the toner mother particles, positive chargeability of the toner decreases and the toner tends to be insufficiently charged. On the basis of the above knowledge that the present inventor acquired from experiments and the like, the present inventor invented the positively chargeable toner having the aforementioned basic features. The first resin detachment ratio is no greater than 20% and the second resin detachment ratio is at least 30% and no greater than 60% in the toner having the aforementioned basic features. When the first resin particles have sufficiently great fixation strength, decrease in charge amount of the toner due to detachment of the positively chargeable external additive (specifically, the first resin particles) from the toner particles can be prevented. When the second resin particles have appropriately small fixation strength, decrease in charge amount of the toner due to the negatively chargeable external additive (specifically, the second resin particles) being embedded in the toner mother particles can be prevented. When an appropriate amount of the negatively chargeable external additive (specifically, the second resin particles) are detached from the toner particles, positive chargeability of the toner can be appropriately increased as time elapses from start of use of the toner. For the reasons as above, favorable chargeability of the toner having the aforementioned basic features can be maintained and toner scattering can be prevented in continuous printing. Thus, it is thought that use of the toner such as above can achieve continuous formation of high-quality images. In view of producibility of the toner, the first resin detachment ratio is preferably at least 3%.

In order to ensure sufficient fixability of the toner, a temperature at which a melt viscosity of the toner having the aforementioned basic features (specifically, the positively chargeable toner) measured by a flow tester reaches $1.0 \times 10^5$ Pa·s is preferably at least 77.5° C. and no greater than 82.5° C. A method for measuring the above temperature is a method described later in Examples or an alternative method thereof.

In order to inhibit variation in chargeability of the toner that is accompanied by long term use of the toner, the first resin particles and the second resin particles preferably have the same (or approximate) property. For example, a difference in number average primary particle diameter between the first resin particles and the second resin particles is preferably no greater than 10 nm in terms of an absolute value. Preferably, the first resin particles and the second resin particles are constituted by the same type of resin.

For example, both the first resin particles and the second resin particles preferably contain a cross-linked styrene-acrylic acid-based resin. The cross-linked styrene-acrylic acid-based resin is excellent in chargeability and can make it easier to produce fine particles having uniform shape and dimensions than melamine resins and the like. The cross-linked styrene-acrylic acid-based resin is excellent in durability and charge stability. As to charge stability, use of the cross-linked styrene-acrylic acid-based resin can inhibit decrease in charge amount especially in a high-temperature and high-humidity environment.

A preferable example of a combination of the first resin particles and the second resin particles in the aforementioned basic features is a combination of the first resin particles containing a polymer (also referred to below as a first cross-linked styrene-acrylic acid-based resin) and the second resin particles containing a polymer (also referred to below as a second cross-linked styrene-acrylic acid-based resin). The first cross-linked styrene-acrylic acid-based resin is a polymer of a (meth)acrylic acid alkyl ester having an ester moiety substituted by an alkyl group having a carbon number of at least 1 and no greater than 4 (also referred to below as a first (meth)acrylic acid alkyl ester), a styrene-based monomer (also referred to below as a first styrene-based monomer), and a cross-linking agent having at least two unsaturated bonds (also referred to below as a first cross-linking agent). The second cross-linked styrene-acrylic acid-based resin is a polymer of (meth)acrylic acid alkyl ester having an ester moiety substituted by an alkyl group having a carbon number of at least 1 and no greater than 4 (also referred to below as a second (meth)acrylic acid alkyl ester), a styrene-based monomer (also referred to below as a second styrene-based monomer), and a cross-linking agent having at least two unsaturated bonds (also referred to below as a second cross-linking agent).

In order to inhibit variation in chargeability of the toner that is accompanied by long term use of the toner, the cross-linked styrene-acrylic acid-based resin contained in the first resin particles and the cross-linked styrene-acrylic acid-based resin contained in the second resin particles are preferably constituted by the same type of monomer and the same type of cross-linking agent. For example, in the above-described combination of the first and second cross-linked styrene-acrylic acid-based resins, it is preferable that: the first and second (meth)acrylic acid alkyl esters each are butyl methacrylate; the first and second styrene-based monomers each are styrene; and the first and second cross-linking agents each are divinylbenzene or ethylene glycol dimetacrylate.

In a preferable example of a combination of the cationic surfactant and the anionic surfactant in the aforementioned basic features, the cationic surfactant is at least one surfactant selected from the group consisting of alkyl trimethyl ammonium salts substituted by an alkyl group having a carbon number of at least 10 and no greater than 25 and alkylamine acetates substituted by an alkyl group having a carbon number of at least 10 and no greater than 25, and the anionic surfactant is at least one surfactant selected from the group consisting of alkylsulfuric acid ester salts substituted by an alkyl group having a carbon number of at least 10 and no greater than 25 and straight-chain alkyl benzene sulfonates substituted by a straight-chain alkyl group having a carbon number of at least 10 and no greater than 25.

The toner mother particles may be toner mother particles each including no shell layer (also referred to below as non-capsule toner mother particles) or toner mother particles each including a shell layer (also referred to below as capsule toner mother particles). Capsule toner mother particles can be produced by forming shell layers on the surfaces of the non-capsule toner mother particles (toner cores). The shall layers may be substantially made from a thermosetting resin or a thermoplastic resin, or may contain both a thermoplastic resin and a thermosetting resin.

Unlike internal additives, the external additive is not present within the toner mother particles, and is selectively present only on the surfaces of the toner mother particles. External additive particles can be caused to adhere to the surfaces of the toner mother particles for example by stirring the toner mother particles and the external additive (particles) together in an external addition process. Stirring causes unification of the external additive particles and the toner mother particle with a result that the external additive particles are stably held on the surface of each of the toner mother particles. The toner mother particle and the external additive particles are connected together physically rather than chemically without chemical reaction therebetween. Connection strength between the toner mother particle and the external additive particles can be adjusted for example by adjusting mixing conditions (specific examples include mixing period and rotational speed of stirring) and particle size, particle shape, particle hardness, and surface state of the external additive particles.

The initial chargeability of the toner can be adjusted for example according to respective types of the external additives of the toner particles. For example, when inorganic particles (e.g., hydrophobic silica particles) having higher positive chargeability than the first resin particles are caused to adhere to the surfaces of the toner mother particles in addition to the first resin particles and the second resin particles, positive chargeability of the toner can be increased. In order to inhibit excessive charge (particularly, local abnormal charge) of the toner particles, inorganic particles having low electric resistance (e.g., conductive titanium oxide particles) are preferably caused to adhere to the surfaces of the toner mother particles in addition to the first resin particles and the second resin particles.

In order to inhibit detachment of the external additive particles, it is preferable that the external additive particles are connected strongly to the surfaces of the toner mother particles. The external additive particles may be secured to the surfaces of the toner mother particles by mechanical connection through embedment. For external additive particles for example having a large particle diameter (e.g., the first resin particles), the external additive particles can be secured to the surfaces of the toner mother particles by stirring the toner mother particles and the external additive for an extended period of time so that respective parts (bottom portions) of the external additive particles are embedded in the surface portions of the toner mother particles. However, in a case where the external additive particles have an excessively large particle diameter, it is difficult to secure the external additive particles to the surfaces of the toner mother particles. In order to increase fluidity of the toner through use of the external additive particles, it is preferable that the external additive particles are weakly connected to the surfaces of the toner mother particles (for example, spherical external additive particles having a small particle diameter adhere to the surfaces of the toner mother particles in a rotatable manner). The external additive particles for increasing fluidity of the toner (e.g., silica particles) preferably adhere to the surfaces of the toner mother particles predominantly by Van der Waals force or electrostatic force.

In order to ensure both sufficient chargeability and sufficient fluidity of the toner, it is preferable that the first resin particles are secured to the surfaces of the toner mother particles predominantly by mechanical connecting force through embedment and the other types of external additive particles (e.g., the second resin particles and the inorganic particles) are secured to the surfaces of the toner mother particles predominantly by Van der Waals force or electrostatic force. The external additive particles can be secured to the surfaces of the toner mother particles by Van der Waals force or electrostatic force even in a state in which the external additive particles are not embedded in the toner mother particles. The first resin particles and the other types of external additive particles are preferably present on the surface of each toner mother particle in a manner that a first resin particle and the other types of external additive particles are stacked in the stated order from a side close to the toner mother particle. When the first resin particles (external additive) are caused to adhere to the surfaces of the toner mother particles and the other external additives are added to and mixed with the toner mother particles, to which the first resin particles have adhered, using a mixer, the first resin particles are pushed into the toner mother particles by the other external additives with a result that fixation strength of the first resin particles against the toner mother particles increases. As described above, the first resin particles externally added to each of the toner mother particles are located closer to the toner mother particle (lower) than the second resin particles and the inorganic particles. That is, the first resin particles are not present on a side farther from the center of the toner mother particle than the second resin particles. Also, the first resin particles are not present on a side farther from the center of the toner mother particle than the inorganic particles. In a configuration in which the other external additives include the second resin particles and the inorganic particles, a second resin particle and an inorganic particle may be stacked in the stated order from a side close to the toner mother particle. Alternatively, an inorganic particle and a second resin particle may be stacked in the stated order from a side close to the toner mother particle. A second resin particle and an inorganic particle may be present on the same level. The phrase "a second resin particle and an inorganic particle are present on the same level" means that both a second resin particle located on an inorganic particle and an inorganic particle located on a second resin particle are present and which particle of a second resin particle and an inorganic particle is located below (or on) the other is indefinite.

An example of preferable mixers for mixing the toner mother particles (particles), the first resin particles, and the other external additives together is an FM mixer (product of Nippon Coke & Engineering Co., Ltd.). The FM mixer includes a mixing tank equipped with a jacket for temperature adjustment, and further includes in the mixing tank a deflector, a temperature sensor, an upper impeller, and a lower impeller. In mixing a material (specific examples include a powder and a slurry) loaded into the mixing tank using the FM mixer, the lower impeller rotates to cause the material in the mixing tank to swirl and flow up and down. Through the above, convective flow of the material is caused in the mixing tank. The upper impeller rotates at high speed to provide shear force to the material. The FM mixer, which provides the shear force to the material, is capable of mixing the material by strong mixing power.

In a configuration in which the toner mother particles in the aforementioned basic features are capsule toner mother particles, the shell layers preferably have the following features in order to ensure sufficient heat-resistant preservability, sufficient fixability, and sufficient chargeability of the toner and in order that the shell layers have appropriate surface adsorptiveness. Each of the shell layers includes a resin film constituted mainly by a mass of resin particles having a glass transition point of at least 50° C. and no greater than 100° C. The resin particles constituting the resin film have a number average roundness of at least 0.55 and no greater than 0.75. The resin particles of the shell layer contain a resin including at least one repeating unit derived from a styrene-based monomer, at least one repeating unit substituted by an alcoholic hydroxyl group, and at least one repeating unit derived from a nitrogen atom-containing vinyl compound. The repeating unit derived from the styrene-based monomer has the highest mass ratio among repeating units included in the resin contained in the resin particles.

In a configuration in which the shell layers have the above features, the toner cores preferably have the following features in order to improve adhesion between the toner cores and the shell layers (eventually, increase connection strength therebetween) and ensure sufficient fixability of the toner. The toner cores contain a polyester resin having an acid value of at least 20 mgKOH/g and no greater than 60 mgKOH/g, a hydroxyl value of at least 20 mgKOH/g and no greater than 60 mgKOH/g, a glass transition point of at least 40° C. and no greater than 55° C., and a softening point of at least 80° C. and no greater than 100° C. The polyester resin contains bisphenol as an alcohol component.

In order to allow the first resin particles and the second resin particles to favorably function, it is preferable that relative to 100 parts by mass of the toner mother particles, an amount of the first resin particles is at least 0.3 parts by mass and no greater than 1.2 parts by mass and an amount of the second resin particles is at least 0.3 parts by mass and no greater than 1.2 parts by mass.

In order to obtain a toner suitable for image formation, the toner preferably has a volume median diameter ($D_{50}$) of at least 4 μm and no greater than 9 μm.

The following describes a toner production method. A material for forming shell layers is referred to below as a shell material.

Toner cores can be produced for example by a pulverization method or an aggregation method. Through the above methods, an internal additive can be easily and favorably dispersed in a binder resin contained in the toner cores. Typically, toner cores are categorized into pulverized cores (also called a pulverized toner) and polymerized cores (also called a chemical toner). Toner cores produced by the pulverization method belong to pulverized cores, while toner cores produced by the aggregation method belong to polymerized cores. Preferably, the toner cores of the toner having the aforementioned basic features are pulverized cores containing a polyester resin.

In an example of the pulverization method, a binder resin, a colorant, a charge control agent, and a releasing agent are mixed together first. Subsequently, the resultant mixture is melt-kneaded using a melt-kneader (e.g., a single or twin screw extruder). Next, the resultant melt-kneaded product is pulverized and the resultant pulverized product is classified. Through the above, toner cores are produced.

In an example of the aggregation method, fine particles of a binder resin, fine particles of a releasing agent, fine particles of a charge control agent, and fine particles of a colorant are allowed to aggregate in an aqueous medium including the fine particles of each of the binder resin, the releasing agent, the charge control agent, and the colorant until the resultant particles have a desired particle diameter. As a result, aggregated particles containing the binder resin, the releasing agent, the charge control agent, and the colorant are formed. The resultant aggregated particles are then heated to cause coalescence of components contained in the aggregated particles. Through the above, toner cores having a desired particle diameter are produced.

Examples of shell layer formation methods include in-situ polymerization, in-liquid curing film coating, and coacervation. Specifically, a method for forming shell layers on the surfaces of toner cores (first shell layer formation method) is preferable in which the toner cores are added into an aqueous medium in which a water-soluble shell material is dissolved and then the aqueous medium is heated to cause a polymerization reaction of the shell material to proceed.

Resin particles (e.g., a resin dispersion) may be used as the shell material in shell layer formation. Specifically, a method for forming shell layers on the surfaces of toner cores (second shell layer formation method) is preferable in which resin particles are caused to adhere to the surfaces of the toner cores in a liquid (e.g., an aqueous medium) including the resin particles and the toner cores and then the liquid is heated to cause formation of films of the resin particles to proceed. Keeping the liquid at high temperature can allow connection among the resin particles on the surfaces of the toner cores (eventually, a cross-linking reaction of the resin particles) to proceed. Formation of films of the resin particles on the surfaces of the toner cores may proceed through application of physical impact to the toner cores with the resin particles adhering to the surfaces thereof.

The aqueous medium is a medium containing water as a main component (specific examples include pure water and a mixed liquid of water and a polar medium). For example, an alcohol (specific examples include methanol and ethanol) may be used as the polar medium in the aqueous medium. The aqueous medium has a boiling point of approximately 100° C.

The following describes a preferable example of a configuration of the toner particles. A non-essential component may be omitted in accordance with intended use of the toner.

[Toner Cores]

The toner cores contain a binder resin. The toner cores may further contain an internal additive (for example, at least one of a colorant, a releasing agent, a charge control agent, and a magnetic powder).

(Binder Resin)

The binder resin is typically a main component (for example, at least 85% by mass) of the toner cores. Properties of the binder resin are therefore expected to have great influence on an overall property of the toner cores.

Examples of preferable binder resins include styrene-based resins, acrylic acid-based resins (specific examples include polymer of acrylic acid ester and polymer of methacrylic acid ester), olefin-based resins (specific examples include polyethylene resin and polypropylene resin), vinyl chloride resins, polyvinyl alcohols, vinyl ether resins, N-vinyl resins, polyester resins, polyamide resins, and urethane resins. Copolymers of the above listed resins, that is, copolymers obtained by introducing a repeating unit into the above-listed resins (specific examples include styrene-acrylic acid-based resin and styrene-butadiene-based resin) may be used.

In order to achieve both heat-resistant preservability and low-temperature fixability of the toner, the toner cores preferably contain at least one of a polyester resin and a styrene-acrylic acid-based resin and particularly preferably contains a polyester resin.

The polyester resin can be obtained by condensation polymerization of at least one polyhydric alcohol (specific examples include aliphatic diols, bisphenols, and tri- or higher-hydric alcohols listed below) and at least one polybasic carboxylic acid (specific examples include dibasic carboxylic acids and tri- or higher-basic carboxylic acids listed below). The polyester resin may include a repeating unit derived from another monomer (monomer that is neither a polyhydric alcohol nor a polybasic carboxylic acid).

Examples of preferable aliphatic diols include diethylene glycol, triethylene glycol, neopentyl glycol, 1,2-propanediol, α,ω-alkanediols (specific examples include ethylene glycol, 1,3-propanediol, 1,4-butanediol, 1,5-pentanediol, 1,6-hexanediol, 1,7-heptanediol, 1,8-octanediol, 1,9-nonanediol, and 1,12-dodecanediol), 2-butene-1,4-diol, 1,4-cyclohexanedimethanol, dipropylene glycol, polyethylene glycol, polypropylene glycol, and polytetramethylene glycol.

Examples of preferable bisphenols include bisphenol A, hydrogenated bisphenol A, bisphenol A ethylene oxide adduct, and bisphenol A propylene oxide adduct.

Examples of preferable tri- or higher-hydric alcohols include sorbitol, 1,2,3,6-hexanetetraol, 1,4-sorbitan, pentaerythritol, dipentaerythritol, tripentaerythritol, 1,2,4-butanetriol, 1,2,5-pentanetriol, glycerol, diglycerol, 2-methylpropanetriol, 2-methyl-1,2,4-butanetriol, trimethylolethane, trimethylolpropane, and 1,3,5-trihydroxymethylbenzene.

Examples of preferable dibasic carboxylic acids include aromatic dicarboxylic acids (specific examples include phthalic acid, terephthalic acid, and isophthalic acid), α,ω-alkanedicarboxylic acids (specific examples include malonic acid, succinic acid, adipic acid, suberic acid, azelaic acid, sebacic acid, and 1,10-decanedicarboxylic acid), alkyl succinic acids (specific examples include n-butylsuccinic acid, isobutylsuccinic acid, n-octylsuccinic acid, n-dodecylsuccinic acid, and isododecylsuccinic acid), alkenyl succinic acids (specific examples include n-butenylsuccinic acid, isobutenylsuccinic acid, n-octenylsuccinic acid, n-dodecenylsuccinic acid, and isododecenylsuccinic acid), maleic acid, fumaric acid, citraconic acid, itaconic acid, glutaconic acid, and cyclohexanedicarboxylic acid.

Examples of preferable tri- or higher-basic carboxylic acids include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and EMPOL trimer acid.

A polyester resin having a glass transition point (Tg) of at least 40° C. and no greater than 55° C. and a softening point (Tm) of at least 80° C. and no greater than 100° C. is preferable as the binder resin. A polyester resin containing a bisphenol (for example, either or both a bisphenol A ethylene oxide adduct and a bisphenol A propylene oxide adduct) as an alcohol component is preferable as the polyester resin having a glass transition point (Tg) of at least 40° C. and no greater than 55° C. and a softening point (Tm) of at least 80° C. and no greater than 100° C.

(Colorant)

The toner cores may contain a colorant. The colorant can be a known pigment or dye that matches the color of the toner. In order to obtain a toner suitable for image formation, the amount of the colorant is preferably at least 1 part by mass and no greater than 20 parts by mass relative to 100 parts by mass of the binder resin.

The toner cores may contain a black colorant. Carbon black can for example be used as a black colorant. Alternatively, a colorant can be used that has been adjusted to a black color using a yellow colorant, a magenta colorant, and a cyan colorant.

The toner cores may contain a non-black colorant such as a yellow colorant, a magenta colorant, or a cyan colorant.

At least one compound selected from the group consisting of condensed azo compounds, isoindolinone compounds, anthraquinone compounds, azo metal complexes, methine compounds, and arylamide compounds can be used as the yellow colorant. Specific examples of yellow colorants that can be preferably used include C.I. Pigment Yellow (3, 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, or 194), Naphthol Yellow S, Hansa Yellow G, and C.I. Vat Yellow.

At least one compound selected from the group consisting of condensed azo compounds, diketopyrrolopyrrole compounds, anthraquinone compounds, quinacridone compounds, basic dye lake compounds, naphthol compounds, benzimidazolone compounds, thioindigo compounds, and perylene compounds can be used as the magenta colorant. Specific examples of magenta colorants that can be preferably used include C.I. Pigment Red (2, 3, 5, 6, 7, 19, 23, 48:2, 48:3, 48:4, 57:1, 81:1, 122, 144, 146, 150, 166, 169, 177, 184, 185, 202, 206, 220, 221, or 254).

At least one compound selected from the group consisting of copper phthalocyanine compounds, anthraquinone compounds, and basic dye lake compounds can be used as the cyan colorant. Specific examples of cyan colorants that can preferably be used include C.I. Pigment Blue (1, 7, 15, 15:1, 15:2, 15:3, 15:4, 60, 62, or 66), Phthalocyanine Blue, C.I. Vat Blue, and C.I. Acid Blue.

(Releasing Agent)

The toner cores may contain a releasing agent. The releasing agent is for example used in order to improve fixability or offset resistance of the toner. The amount of the releasing agent is preferably at least 1 part by mass and no greater than 30 parts by mass relative to 100 parts by mass of the binder resin in order to improve fixability or offset resistance of the toner.

Examples of releasing agents that can be preferably used include: aliphatic hydrocarbon waxes such as low molecular weight polyethylene, low molecular weight polypropylene, polyolefin copolymer, polyolefin wax, microcrystalline wax, paraffin wax, and Fischer-Tropsch wax; oxides of aliphatic hydrocarbon waxes such as polyethylene oxide wax and block copolymer of polyethylene oxide wax; plant waxes such as candelilla wax, carnauba wax, Japan wax, jojoba wax, and rice wax; animal waxes such as beeswax, lanolin, and spermaceti; mineral waxes such as ozokerite, ceresin, and petrolatum; waxes having a fatty acid ester as a main component such as montanic acid ester wax and castor wax; and waxes in which a part or all of a fatty acid ester has been deoxidized such as deoxidized carnauba wax. A releasing agent may be used alone, or two or more releasing agents may be used in combination.

(Charge Control Agent)

The toner cores may contain a charge control agent. The charge control agent is for example used in order to improve charge stability or a charge rise characteristic of the toner. The charge rise characteristic of the toner is an indicator as to whether the toner can be charged to a specific charge level in a short period of time.

Cationic strength of the toner cores can be increased by containing a positively chargeable charge control agent (specific examples include pyridine, nigrosine, and quaternary ammonium salt) in the toner cores. However, the toner cores need not contain a charge control agent in a configuration in which sufficient chargeability of the toner can be ensured.

(Magnetic Powder)

The toner cores may contain a magnetic powder. Examples of materials of the magnetic powder that can be preferably used include ferromagnetic metals (specific examples include iron, cobalt, nickel, and alloys containing at least one of the aforementioned metals), ferromagnetic metal oxides (specific examples include ferrite, magnetite, and chromium dioxide), and materials subjected to ferromagnetization (specific examples include carbon materials made ferromagnetic through thermal treatment). Magnetic particles subjected to surface treatment are preferably used as the magnetic powder in order to inhibit elution of metal ions (e.g., iron ions) from the magnetic powder. One magnetic powder may be used alone, or two or more magnetic powders may be used in combination.

[Shell Layers]

In order to allow the shell layers to have appropriate surface adsorptiveness while ensuring sufficient heat-resistant preservability, sufficient fixability, and sufficient chargeability of the toner, each of the shell layers preferably includes a resin film constituted by a mass of resin particles having a glass transition point of at least 50° C. and no greater than 100° C. The resin particles constituting the resin film have a number average roundness of at least 0.55 and no greater than 0.75. The resin particles having a glass transition point of at least 50° C. and no greater than 100° C. may be referred to below as "thermally resistant particles".

The shell layers such as above (i.e., resin films constituted by a mass of the thermally resistant particles) preferably have a thickness of at least 10 nm and no greater than 35 nm in order to ensure sufficient heat-resistant preservability, sufficient fixability, and sufficient chargeability of the toner.

The thickness of the shell layers can be determined by analyzing a transmission electron microscope (TEM) image of cross sections of toner particles using commercially available image analysis software (e.g., "WinROOF" product of Mitani Corporation). In a situation in which the thickness of the shell layer of a single toner particle is not uniform, the thickness of the shell layer is measured at each of four locations that are approximately evenly spaced (specifically, four locations at which the shell layer intersects with either of two orthogonal straight lines intersecting with each other at the substantial center of the cross section of the toner particle) and the arithmetic mean of the four measured values is determined to be an evaluation value (thickness of the shell layer) for the toner particle. A boundary between a toner core and a shell layer can be confirmed for example by selectively dying only the shell layers among the toner cores and the shell layers. In a situation in which a boundary between a toner core and a shell layer is vague on a TEM image, the boundary between the toner core and the shell layer can be defined by mapping of distinctive elements contained in the shell layers by combination of TEM and electron energy loss spectroscopy (EELS) in the TEM image.

In order to ensure sufficient heat-resistant preservability, sufficient fixability, and sufficient chargeability of the toner, the shell layers such as above (i.e., the resin films constituted by a complex of the thermally resistant particles) preferably cover at least 50% and no greater than 85% of the area of surface regions of the toner cores. The area percentage of surface regions of the toner cores that are covered with the shell layers (also referred to below as a shell coverage) can be determined by capturing an image of the surfaces of the toner particles (for example, toner particles dyed in advance) using an electron microscope and analyzing the captured image using commercially available image analysis software.

Preferably, the thermally resistant particles are substantially constituted by a polymer (resin) of monomers including at least one vinyl compound. The polymer of monomers including at least one vinyl compound includes a repeating unit derived from the vinyl compound. Thermally resistant particles having a desired property can be easily and surely obtained by polymerization of a vinyl compound substituted by a functional group according to a property that the toner has to have. The vinyl compound is a compound having a vinyl group ($CH_2$=CH—) or a substituted vinyl group in which hydrogen is replaced (specific examples include ethylene, propylene, butadiene, vinyl chloride, acrylic acid, methyl acrylate, methacrylic acid, methyl methacrylate, acrylonitrile, and styrene). The vinyl compound may be addition polymerized by a carbon double bond (C=C) included in a group such as the vinyl group to be a polymer (resin).

The resin constituting the thermally resistant particles preferably includes for example a repeating unit derived from a nitrogen atom-containing vinyl compound (specific examples include quaternary ammonium compounds and pyridine compounds). For example, a repeating unit derived from 4-vinyl pyridine is preferable as a repeating unit derived from a pyridine compound. A repeating unit represented by the following formula (1) or a salt thereof is preferable as a repeating unit derived from a quaternary ammonium compound.

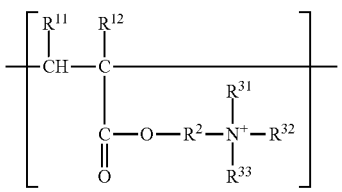

(1)

In formula (1), $R^{11}$ and $R^{12}$ each represent, independently of one another, a hydrogen atom, a halogen atom, or an alkyl group optionally substituted by a substituent. $R^{31}$, $R^{32}$, and $R^{33}$ each represent, independently of one another, a hydrogen atom, an alkyl group optionally substituted by a substituent, or an alkoxy group optionally substituted by a substituent. $R^2$ represents an alkylene group optionally substituted by a substituent. Preferably, $R^{11}$ and $R^{12}$ each represent, independently of one another, a hydrogen atom or a methyl group. A combination of $R^{11}$ representing a hydrogen atom and $R^{12}$ representing a hydrogen atom or a methyl group is particularly preferable. $R^{31}$, $R^{32}$, and $R^{33}$ each preferably represent, independently of one another, an alkyl group having a carbon number of at least 1 and no greater than 8 and particularly preferably represent a methyl group, an ethyl group, an n-propyl group, an iso-propyl group, an n-butyl group, or an iso-butyl group. $R^2$ preferably represents an alkylene group having a carbon number of at least 1 and no greater than 6 and particularly preferably represents a methylene group or an ethylene group. In a repeating unit derived from 2-(methacryloyloxy)ethyl trimethylammonium chloride, $R^{11}$ represents a hydrogen atom, $R^{12}$ represents a methyl group, $R^2$ represents an ethylene group, $R^{31}$ to $R^{33}$ each represent a methyl group, and quaternary ammonium cation ($N^+$) is ion bonded to chlorine (Cl) to form a salt.

The resin constituting the thermally resistant particles preferably includes for example a repeating unit derived from a styrene-based monomer and particularly preferably includes a repeating unit represented by the following formula (2).

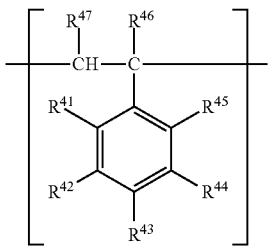

(2)

In formula (2), $R^{41}$ to $R^{45}$ each represent, independently of one another, a hydrogen atom, a halogen atom, a hydroxyl group, an alkyl group optionally substituted by a substituent, an alkoxy group optionally substituted by a substituent, or an aryl group optionally substituted by a substituent. $R^{46}$ and $R^{47}$ each represent, independently of one another, a hydrogen atom, a halogen atom, or an alkyl group optionally substituted by a substituent. Preferably, $R^{41}$ to $R^{45}$ each represent, independently of one another, a hydrogen atom, a halogen atom, an alkyl group having a carbon number of at least 1 and no greater than 4, an alkoxy group having a carbon number of at least 1 and no greater than 4, or an alkoxyalkyl group having a carbon number (specifically, a total carbon number of alkoxy and alkyl) of at least 2 and no greater than 6. Preferably, $R^{46}$ and $R^{47}$ each represent, independently of one another, a hydrogen atom or a methyl group. A combination of $R^{47}$ representing a hydrogen atom and $R^{46}$ representing a hydrogen atom or a methyl group is particularly preferable. In a repeating unit derived from styrene, $R^{41}$ to $R^{47}$ each represent a hydrogen atom. In a repeating unit derived from 4-chlorostyrene, $R^{43}$ represents a chloro group (Cl—), and $R^{41}$, $R^{42}$, and $R^{44}$ to $R^{47}$ each represent a hydrogen atom. In a repeating unit derived from 2-(ethoxymethyl)styrene, $R^{41}$ represents an ethoxymethyl group ($C_2H_5OCH_2$—), and $R^{42}$ to $R^{47}$ each represent a hydrogen atom.

In order that the shell layers have sufficiently high hydrophobicity and appropriate strength, the repeating unit derived from a styrene-based monomer preferably has the highest mass ratio among repeating units included in the resin constituting the thermally resistant particles.

In order that the shell layers have appropriate surface adsorptiveness, the resin constituting the thermally resistant particles preferably includes a repeating unit substituted by an alcoholic hydroxyl group and particularly preferably includes a repeating unit represented by the following formula (3).

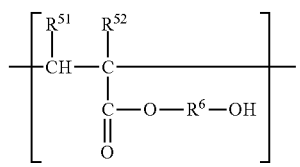

(3)

In formula (3), $R^{51}$ and $R^{52}$ each represent, independently of one another, a hydrogen atom, a halogen atom, or an alkyl group optionally substituted by a substituent. $R^6$ represents an alkylene group optionally substituted by a substituent. Preferably, $R^{51}$ and $R^{52}$ each represent, independently of one another, a hydrogen atom or a methyl group. A combination of $R^{51}$ representing a hydrogen atom and $R^{52}$ representing a hydrogen atom or a methyl group is particularly preferable. $R^6$ preferably represents an alkylene group having a carbon number of at least 1 and no greater than 6 and more preferably represents an alkylene group having a carbon number of at least 1 and no greater than 4. In a repeating unit derived from 2-hydroxyethyl methacrylate (HEMA), $R^{51}$ represents a hydrogen atom, $R^{52}$ represents a methyl group, and $R^6$ represents an ethylene group (—$(CH_2)_2$—).

In order to sufficiently inhibit adsorption of moisture in the air to the surfaces of the shell layers while inhibiting detachment of the shell layers, the resin constituting the thermally resistant particles preferably does not include a repeating unit having any of an acid group, a hydroxyl group, and salts thereof other than the repeating unit substituted by an alcoholic hydroxyl group.

In order to obtain a toner suitable for image formation, the resin constituting the thermally resistant particles preferably includes at least one repeating unit selected from the group consisting of repeating units represented by formula (1), repeating units represented by formula (2), and repeating units represented by formula (3).

In order to obtain a toner excellent in chargeability, heat-resistant preservability, and low-temperature fixability, it is preferable that the resin constituting the thermally resistant particles includes at least one repeating unit derived from a styrene-based monomer, at least one repeating unit substituted by an alcoholic hydroxyl group, and at least one repeating unit derived from a nitrogen atom-containing vinyl compound, and the repeating unit derived from a styrene-based monomer has the highest mass ratio among repeating units included in the resin constituting the thermally resistant particles. Examples of preferable styrene-based monomers include styrene, methylstyrene, butylstyrene, methoxystyrene, bromostyrene, and chlorostyrene. (Meth)acrylic acid 2-hydroxyethyl alkyl ester is preferable as a monomer substituted by an alcoholic hydroxyl group (monomer for introducing the repeating unit substituted by an alcoholic hydroxyl group into the resin). Examples of preferable (meth)acrylic acid 2-hydroxyethyl alkyl esters include 2-hydroxyethyl acrylate (HEA), 2-hydroxypropyl acrylate (HPA), 2-hydroxyethyl methacrylate (HEMA), and 2-hydroxypropyl methacrylate. A (meth)acryloyl group-containing quaternary ammonium compound is preferable as the nitrogen atom-containing vinyl compound. Examples of preferable (meth)acryloyl group-containing quaternary ammonium compounds include (meth)acrylamide alkyl trimethylammonium salts (a specific example is (3-acrylamidepropyl)trimethylammonium chloride), and (meth)acryloyloxyalkyl trimethylammonium salts (a specific example is 2-(methacryloyloxy)ethyl trimethylammonium chloride).

The resin constituting the thermally resistant particles may further include at least one repeating unit derived from (meth)acrylic acid alkyl ester in addition to the at least one repeating unit derived from a styrene-based monomer, the at least one repeating unit substituted by an alcoholic hydroxyl group, and the at least one repeating unit derived from a nitrogen atom-containing vinyl compound. Examples of preferable (meth)acrylic acid alkyl esters include methyl (meth)acrylate, ethyl (meth)acrylate, n-propyl (meth)acrylate, iso-propyl (meth)acrylate, n-butyl (meth)acrylate, and iso-butyl (meth)acrylate.

[External Additive]

The toner mother particles of the toner having the aforementioned basic features each have a surface to which an external additive (specifically, a plurality of first resin particles and a plurality of second resin particles) adheres.

Preferably, the first resin particles and the second resin particles are, independently of one another, resin particles containing at least one resin selected from the group consisting of cross-linked styrene-based resins, cross-linked acrylic acid-based resins, cross-linked styrene-acrylic acid-based resins, cross-linked polyester resins, cross-linked urethane resins, cross-linked polyacrylamide resins, and cross-linked polyacrylonitrile resins. Particularly preferably, the resin particles contain, among the resins listed above, a polymer (specifically, a cross-linked styrene-acrylic acid-based resin) of monomers (resin raw materials) including methacrylic acid alkyl ester having an ester moiety substituted by an alkyl group having a carbon number of at least 1 and no greater than 4 (e.g., butyl methacrylate having an ester moiety substituted by a butyl group having a carbon number of 4), a styrene-based monomer (e.g., styrene), and a cross-linking agent having at least two unsaturated bonds (e.g., divinylbenzene).

The cross-linked styrene-acrylic acid-based resin is a polymer of at least one styrene-based monomer, at least one acrylic acid-based monomer, and a cross-linking agent. Styrene-based monomers, acrylic acid-based monomers, and cross-linking agents listed below can be preferably used for example for synthesis of a cross-linked styrene-acrylic acid-based resin.

Examples of preferable styrene-based monomers include styrene, alkylstyrenes (specific examples include α-methylstyrene, o-methylstyrene, m-methylstyrene, p-methylstyrene, ethylstyrene, 2,3-dimethyl styrene, 2,4-dimethylstyrene, o-tert-butylstyrene, m-tert-butylstyrene, and p-tert-butylstyrene) and halogenated styrenes (specific examples include α-chlorostyrene, o-chlorostyrene, m-chlorostyrene, and p-chlorostyrene).

Examples of preferable acrylic acid-based monomers include (meth)acrylic acid, (meth)acrylonitrile, and (meth)acrylic acid alkyl esters. Examples of preferable (meth)acrylic acid alkyl esters include methyl (meth)acrylate, ethyl (meth)acrylate, n-propyl (meth)acrylate, iso-propyl (meth)acrylate, n-butyl (meth)acrylate, iso-butyl (meth)acrylate, and 2-ethylhexyl (meth)acrylate.

The cross-linking agent is preferably a compound having at least two unsaturated bonds and particularly preferably a monocyclic compound having at least two functional groups each having an unsaturated bond (a specific example is divinylbenzene) or a condensate of one polyhydric alcohol and at least two monobasic carboxylic acids each substituted by a functional group having an unsaturated bond (specific examples include ethylene glycol dimethacrylate and butanediol dimethacrylate). Examples of the functional groups having an unsaturated bond include a vinyl group ($CH_2=CH-$) and a substituted vinyl group in which hydrogen is replaced.

A cationic surfactant having higher positive chargeability than the first resin particles is present on the surfaces of the first resin particles. A preferable cationic surfactant is a nitrogen atom (N)-containing cationic surfactant. Examples of preferable nitrogen atom-containing cationic surfactants include quaternary ammonium salt surfactants (specific examples include alkyl trimethyl ammonium salt, dialkyl dimethyl ammonium salt, alkyl benzyl dimethyl ammonium salt, and benzethonium chloride), alkylamine salt surfactants (specific examples include alkylamine acetate and alkylamine hydrochloride), and surfactants having a pyridine ring (specific examples include butylpyridinium chloride and cetylpyridinium chloride). A particularly preferable cationic surfactant is an alkyl trimethyl ammonium salt substituted by an alkyl group having a carbon number of at least 10 and no greater than 25 (a specific example is cetyltrimethylammonium chloride substituted by an alkyl group having a carbon number of 16) or an alkylamine acetate substituted by an alkyl group having a carbon number of at least 10 and no greater than 25 (a specific example is stearylamine acetate substituted by an alkyl group having a carbon number of 18).

An anionic surfactant having higher negative chargeability than the second resin particles is present on the surfaces of the second resin particles. Examples of preferable anionic surfactants include sulfate surfactants (a specific example is alkylsulfuric acid ester salt), sulfonic acid surfactants (specific examples include alkyl sulfonic acid salt, straight-chain alkylbenzenesulfonic acid salt, perfluoroalkyl sulfonic acid salt, and naphthalene sulfonic acid salt), carboxylic acid surfactants (specific examples include perfluorinated fatty acid salt and fatty acid salt substituted by an alkyl group having a carbon number of at least 6 and no greater than 25), and phosphate ester surfactants (specific examples include phosphate ester and alkyl phosphate ester salt). Examples of preferable anionic surfactants include anionic surfactants having a sulfate anion group ($-OSO_3$) or sulfonate anion group ($-SO_3$) (specific examples include a sulfate ester surfactant and a sulfonate surfactant). A particularly preferable anionic surfactant is straight-chain alkylbenzenesulfonic acid salt substituted by a straight-chain alkyl group having a carbon number of at least 10 and no greater than 25 (a specific example is sodium dodecylbenzenesulfonate substituted by a straight-chain alkyl group having a carbon number of 12) or an alkylsulfuric acid ester salt substituted by an alkyl group having a carbon number of at least 10 and no greater than 25 (a specific example is sodium lauryl sulfate substituted by an alkyl group having a carbon number of 12).

Inorganic particles may adhere to the surfaces of the toner mother particles in addition to the first resin particles and the second resin particles. Preferable inorganic particles (toner external additive) are silica particles or particles of metal oxides (specific examples include alumina, titanium oxide, magnesium oxide, zinc oxide, strontium titanate, and barium titanate). Particularly preferable inorganic particles are at least one type of particles selected from the group consisting of silica particles and titanium oxide particles.

The external additive particles may be subjected to surface treatment. For example, in a situation in which silica particles are used as external additive particles, surfaces of the silica particles may be rendered hydrophobic and/or positively chargeable through use of a surface treatment agent. Examples of surface treatment agents that can be preferably used include coupling agents (specific examples include silane coupling agent, titanate coupling agent, and aluminate coupling agent), silazane compounds (specific examples include open-chain silazane compound and cyclic silazane compound), and silicone oils (a specific example is dimethyl silicone oil). Examples of particularly preferable surface treatment agents include silane coupling agents and silazane compounds. Examples of preferable silane coupling agents include silane compounds (specific examples include methyltrimethoxysilane and aminosilane). An example of preferable silazane compounds is hexamethyldisilazane (HMDS).

When a surface of a silica base (untreated silica particles) is treated with a surface treatment agent, a large number of molecules of a hydroxyl group (—OH) present on the surface of the silica base are partially or entirely replaced by a functional group derived from the surface treatment agent. As a result, silica particles having the functional group derived from the surface treatment agent (specifically, a functional group that is more hydrophobic and/or more positively chargeable than a hydroxyl group) on surfaces thereof are obtained. Treatment on the surface of a silica base for example with a silane coupling agent substituted by an amino group causes a dehydration condensation reaction of a hydroxyl group included in the silane coupling agent (for example, a hydroxyl group generated through hydrolysis of an alkoxy group included in the silane coupling agent with moisture) with a hydroxyl group present on the surface of the silica base ("A (silica base)-OH"+"B (coupling agent)-OH"→"A-O—B"+$H_2O$). When silica and the silane coupling agent substituted by an amino group are chemically bonded together through a reaction as above, the amino group is provided on the surfaces of the silica particles, thereby yielding positively chargeable silica particles. Specifically, the hydroxyl group present on the surface of the silica base is substituted by a functional group having an end substituted by an amino group (a specific examples is —O—Si—$(CH_2)_3$—$NH_2$). Silica particles provided with an amino group tend to be more positively chargeable than the silica base (untreated silica particles). When a silane coupling agent substituted by an alkyl group is used, hydrophobic silica particles can be obtained. Specifically, a hydroxyl group present on the surface of the silica base can be substituted by a functional group having an alkyl group at an end thereof (a specific example is —O—Si—$CH_3$) through the above dehydration condensation reaction. The silica particles provided with a hydrophobic group (for example, an alkyl group having a carbon number of at least 1 and no greater than 3) instead of a hydrophilic group (hydroxyl group) as described above tend to be more hydrophobic than the silica base (untreated silica particles).

Inorganic particles each including a conductive layer on a surface thereof may be used as external additive particles. The conductive layer is a film (a specific example is a Sb-doped $SnO_2$ film) of a metal oxide that is rendered electrically conductive for example by doping (also referred to below as a doped metal oxide). The conductive layer may contain a conductive material other than the doped metal oxide (specific examples include metals, carbon materials, and conductive macromolecules). For example, external additive particles having low electric resistance (conductive titanium oxide particles) can be obtained by forming a conductive layer on a surface of a titanium oxide base (untreated titanium oxide particles).

EXAMPLES

The following describes Examples of the present disclosure. Table 1 shows tones TA-1 to TA-7 and TB-1 to TB-9 (positively chargeable toners) of Examples and Comparative Examples. Table 3 shows external additives (resin particles SA-1 to SA-5 and SB-1 to SB-4) each used for production of a corresponding one of the toners shown in Table 1.

TABLE 1

| | | External additive | | | | | |
|---|---|---|---|---|---|---|---|
| | | Resin particles $R_A$ | | Resin particles $R_B$ | | $SiO_2$ | $TiO_2$ |
| Toner | Cores | Type | Amount [part by mass] | Type | Amount [part by mass] | Amount [part by mass] | Amount [part by mass] |
| TA-1 | M-1 | SA-1 | 0.7 | SB-1 | 0.7 | 1.2 | 1.5 |
| TA-2 | M-2 | SA-1 | 0.7 | SB-1 | 0.7 | 1.2 | 1.5 |
| TA-3 | M-1 | SA-1 | 0.7 | SB-2 | 0.7 | 1.2 | 1.5 |
| TA-4 | M-1 | SA-2 | 0.7 | SB-1 | 0.7 | 1.2 | 1.5 |
| TA-5 | M-1 | SA-1 | 0.7 | SB-1 | 1.2 | 1.5 | 0.7 |
| TA-6 | M-1 | SA-5 | 0.7 | SB-1 | 0.7 | 1.2 | 1.5 |
| TA-7 | M-3 | SA-1 | 0.7 | SB-1 | 0.7 | 1.2 | 1.5 |
| TB-1 | M-1 | SB-1 | 1.4 | None | — | 1.2 | 1.5 |
| TB-2 | M-1 | SA-1 | 1.4 | None | — | 1.2 | 1.5 |
| TB-3 | M-1 | SA-1 | 0.7 | SB-1 | 0.7 | 1.2 | 1.5 |
| TB-4 | M-1 | SA-1 | 0.7 | SB-1 | 0.7 | 1.2 | 1.5 |
| TB-5 | M-1 | SA-1 | 0.7 | SB-1 | 0.7 | 1.2 | 1.5 |
| TB-6 | M-1 | SA-1 | 0.7 | SB-3 | 0.7 | 1.2 | 1.5 |
| TB-7 | M-1 | SA-1 | 0.7 | SB-4 | 0.7 | 1.2 | 1.5 |
| TB-8 | M-1 | SA-3 | 0.7 | SB-1 | 0.7 | 1.2 | 1.5 |
| TB-9 | M-1 | SA-4 | 0.7 | SB-1 | 0.7 | 1.2 | 1.5 |

Items representing the respective external additives in Table 1 refer to the followings.

SA-1 to SA-5: resin particles SA-1 to SA-5 listed in Table 3 below.

SB-1 to SB-4: resin particles SB-1 to SB-4 listed in Table 3 below.

$SiO_2$: hydrophobic silica particles ("AEROSIL (registered Japanese trademark) RA-200H" product of Nippon Aerosil Co., Ltd., content: dry silica particles surface-modified with a trimethylsilyl group and an amino group, number average primary particle diameter: approximately 12 nm).

TiO$_2$: conductive titanium oxide particles ("EC-100" product of Titan Kogyo, Ltd., base: TiO$_2$ particles, coat layer: Sb-doped SnO$_2$ film, number average particle diameter: approximately 0.35 μm).

The "number average particle diameter" for the conductive titanium oxide particles does not refer to a number average value of primary particle diameters. With respect to non-aggregated conductive titanium oxide particles, the particle diameter of each of the conductive titanium oxide particles (that is, a primary particle diameter) was measured as a "particle diameter" of a single conductive titanium oxide particle. By contrast, with respect to conductive titanium oxide particles forming aggregated particles (that is, aggregated particles as a result of aggregation of conductive titanium oxide particles), an aggregated particle diameter of a single conductive titanium oxide particle rather than the primary particle diameter thereof was measured as a "particle diameter" thereof. The "particle diameter" as above was measured for each of an appropriate number of conductive titanium oxide particles, and a number average value (that is, a number average particle diameter) of the appropriate number of the "particle diameters" was calculated. The "number average particle diameter" of the conductive titanium oxide particles calculated as above was approximately 0.35 μm.

An "amount (unit: part by mass)" for each external additive in Table 1 refers to a relative amount relative to 100 parts by mass of the toner mother particles.

TABLE 2

| Toner | First external addition | | Second external addition | | Third external addition | |
|---|---|---|---|---|---|---|
| | External additive | Mixing period [minute] | External additive | Mixing period [minute] | External additive | Mixing period [minute] |
| TA-1 | R$_A$ | 10 | R$_B$, SiO$_2$, TiO$_2$ | 5 | None | — |
| TA-2 | | | | | | |
| TA-3 | | | | | | |
| TA-4 | | | | | | |
| TA-5 | R$_A$ | 15 | R$_B$, SiO$_2$, TiO$_2$ | 10 | None | — |
| TA-6 | | 10 | | 5 | None | — |
| TA-7 | R$_A$ | 15 | R$_B$, SiO$_2$, TiO$_2$ | 7 | None | — |
| TB-1 | R$_A$, SiO$_2$, TiO$_2$ | 5 | None | — | None | — |
| TB-2 | R$_A$ | 10 | SiO$_2$, TiO$_2$ | 5 | None | — |
| TB-3 | R$_A$ | 8 | SiO$_2$, TiO$_2$ | 3 | R$_B$ | 2 |
| TB-4 | R$_A$, R$_B$ | 10 | SiO$_2$, TiO$_2$ | 5 | None | — |
| TB-5 | R$_A$, R$_B$, SiO$_2$, TiO$_2$ | 5 | None | — | None | — |
| TB-6 | R$_A$ | 10 | R$_B$, SiO$_2$, TiO$_2$ | 5 | None | — |
| TB-7 | R$_A$ | 5 | R$_B$ | 5 | SiO$_2$, TiO$_2$ | 5 |
| TB-8 | R$_A$ | 10 | R$_B$, SiO$_2$, TiO$_2$ | 5 | None | — |
| TB-9 | R$_A$ | 15 | R$_B$, SiO$_2$, TiO$_2$ | 5 | None | — |

"R$_A$" in Table 2 equates to "Resin particles R$_A$" in Table 1, and "R$_B$" in Table 2 equates to "Resin particles R$_B$" in Table 1. "SiO$_2$" and "TiO$_2$" in Table 2 equate to "SiO$_2$" and "TiO$_2$" in Table 1, respectively.

TABLE 3

| Resin particles | Monomer | | | Cross-linking agent | Surfactant | | | Particle diameter [nm] |
|---|---|---|---|---|---|---|---|---|
| | BMA [g] | MMA [g] | S [g] | DVB [g] | CTAC [g] | SLS [g] | AE [g] | |
| SA-1 | 80 | 0 | 80 | 40 | 20 | 0 | 0 | 80 |
| SA-2 | 80 | 0 | 80 | 40 | 10 | 0 | 10 | 85 |
| SA-3 | 80 | 0 | 80 | 40 | 50 | 0 | 0 | 50 |
| SA-4 | 80 | 0 | 80 | 40 | 10 | 0 | 0 | 110 |
| SA-5 | 0 | 20 | 80 | 30 | 20 | 0 | 0 | 80 |
| SB-1 | 80 | 0 | 80 | 40 | 0 | 15 | 0 | 82 |
| SB-2 | 80 | 0 | 80 | 40 | 0 | 8 | 10 | 89 |
| SB-3 | 80 | 0 | 80 | 40 | 0 | 30 | 0 | 52 |
| SB-4 | 80 | 0 | 80 | 40 | 0 | 5 | 0 | 108 |

Items representing respective resin raw materials in Table 3 refer to the followings.
(Monomer)
BMA: n-butyl methacrylate.
MMA: methyl methacrylate.
S: styrene.
(Cross-Linking Agent)
DVB: divinylbenzene.
(Surfactant)
CTAC: cetyltrimethylammonium chloride.
SLS: sodium lauryl sulfate.
AE: polyoxyethylene lauryl ether.

"Particle diameter (unit: nm)" in Table 3 refers to a number average value of equivalent circle diameters of primary particles measured using a transmission electron microscope (TEM).

The following describes a production method, evaluation methods, and evaluation results for the toners TA-1 to TA-7 and TB-1 to TB-9 in the stated order. In evaluation in which errors may occur, an evaluation value was calculated by calculating the arithmetic mean of an appropriate number of measured values in order to ensure that any errors were sufficiently small.

[Preparation of Materials]
(Preparation of Toner Cores M-1 to M-3)
A polyester resin was obtained by causing a reaction between an acid substituted by a polyfunctional group (specifically, terephthalic acid) and a bisphenol A ethylene oxide adduct (specifically, an alcohol produced through addition of ethylene oxide to a bisphenol A framework). In preparation of toner cores M-1, a polyester resin was obtained that had a hydroxyl value (OHV) of 20 mgKOH/g, an acid value (AV) of 40 mgKOH/g, a softening point (Tm) of 100° C., and a glass transition point (Tg) of 48° C. In preparation of toner cores M-2, a polyester resin was obtained that had a hydroxyl value (OHV) of 20 mgKOH/g, an acid value (AV) of 40 mgKOH/g, a softening point (Tm) of 95° C., and a glass transition point (Tg) of 46° C. In preparation of toner cores M-3, a polyester resin was obtained that had a hydroxyl value (OHV) of 20 mgKOH/g, an acid value (AV) of 40 mgKOH/g, a softening point (Tm) of 117° C., and a glass transition point (Tg) of 58° C.

The hydroxyl values (OHV) and the acid values (AV) of the respective polyester resins were adjusted by adjusting the respective amounts of a polyhydric alcohol (i.e., the bisphenol A ethylene oxide adduct) and a polybasic carboxylic acid (i.e., the terephthalic acid) in preparation of each type of the toner cores M-1 to M-3. The hydroxyl value of each polyester resin tended to increase with an increase in amount of the polyhydric alcohol. The acid value of each polyester resin tended to increase with an increase in amount of the polybasic carboxylic acid. The softening point (Tm) of each polyester resin was adjusted by changing polymerization conditions (specifically, temperature and time period for polymerization).

With respect to each type of the toner cores M-1 to M-3, 100 parts by mass of a corresponding one of the polyester resins obtained as above, 5 parts by mass of a colorant (C.I. Pigment Blue 15:3, component: copper phthalocyanine pigment), and 5 parts by mass of an ester wax ("NISSAN ELECTOL (registered Japanese trademark) WEP-3" product of NOF Corporation) were mixed together using an FM mixer (product of Nippon Coke & Engineering Co., Ltd.).

Subsequently, the resultant mixture was melt-kneaded using a twin screw extruder ("PCM-30" product of Ikegai Corp.). The resultant melt-kneaded product was then cooled while being rolled, and pulverized using a pulverizer ("Turbo Mill" product of FREUND-TURBO CORPORATION). Next, the resultant pulverized product was classified using a classifier ("Elbow Jet Type EJ-LABO" product of Nittetsu Mining Co., Ltd.). As a result, toner cores (toner cores M-1 to M-3) were obtained. The toner cores M-1 had a volume median diameter ($D_{50}$) of 6 μm, a roundness of 0.93, a glass transition point (Tg) of 49° C., and a softening point (Tm) of 92° C. The toner cores M-2 had a volume median diameter ($D_{50}$) of 6 μm, a roundness of 0.93, a glass transition point (Tg) of 45° C., and a softening point (Tm) of 88° C. The toner cores M-3 had a volume median diameter ($D_{50}$) of 6 μm, a roundness of 0.93, a glass transition point (Tg) of 58° C., and a softening point (Tm) of 110° C.

(Shell Material: Preparation of Resin Fine Particle Suspension)

A 2-L three-necked flask equipped with a thermometer and a stirring impeller was set up in a water bath set at a temperature of 30° C., and 875 mL of ion exchanged water and 75 mL of an anionic surfactant ("LATEMUL (registered Japanese trademark) WX" product of Kao Corporation, component: sodium polyoxyethylene alkyl ether sulfate, solid concentration: 26% by mass) were added into the flask. Thereafter, the internal temperature of the flask was increased to 80° C. using the water bath. Subsequently, two liquids (first and second liquids) were each dripped at a constant speed over five hours into the flask contents at a temperature of 80° C. The first liquid was a mixed liquid of 18 g of styrene, 2 g of n-butyl acrylate, 2 mL of 2-hydroxyethyl methacrylate (HEMA), and 0.5 g of 2-(methacryloyloxy)ethyl trimethylammonium chloride (product of Alfa Aesar). The second liquid was a solution of 30 mL of ion exchanged water in which 0.5 g of potassium peroxodisulfate was dissolved. Subsequently, the internal temperature of the flask was kept at 80° C. for additional two hours for polymerization of the flask contents. As a result, a resin fine particle suspension was obtained. The resultant suspension included resin fine particles having a number average primary particle diameter of 35 nm and a glass transition point (Tg) of 74° C. The number average primary particle diameter was measured using a transmission electron microscope (TEM).

(External Additive: Preparation of Resin Particles SA-1 to SA-5 and SB-1 to SB-4)

With respect to each type of resin particles SA-1 to SA-5 and SB-1 to SB-4, 600 g of ion exchanged water, 15 g of a polymerization initiator (BPO: benzoyl peroxide), and respective amounts of corresponding types of materials shown in Table 3 were added to 1-L four-necked flask equipped with a stirrer, a cooling pipe, a thermometer, and a nitrogen inlet tube. For example, in preparation of the resin particles SA-1, 80 g of n-butyl methacrylate (BMA), 80 g of styrene (S), 40 g of a cross-linking agent (DVB: divinylbenzene), and 20 g of a cationic surfactant (CTAC: cetyltrimethylammonium chloride) were added. In preparation of the respective types of resin particles SA-1 to SA-5 and SB-1 to SB-4, divinylbenzene (DVB) used as the cross-linking agent had a purity of 80% in terms of mass percentage.

Subsequently, nitrogen gas was introduced into the flask while the flask contents were stirred to establish a nitrogen atmosphere in the flask. The temperature of the flask contents was increased to 90° C. in the nitrogen atmosphere while the flask contents were stirred. The flask contents were caused to react (specifically, polymerization reaction) for three hours in the nitrogen atmosphere at a temperature of 90° C. to obtain an emulsion including a reaction product. The resultant emulsion was then cooled and dehydrated to obtain each type of resin particles SA-1 to SA-5 and SB-1 to SB-4. The particle diameter of each type of the resin particles SA-1 to SA-5 and SB-1 to SB-4 was adjusted by changing stirring conditions in the polymerization reaction. Specifically, the resultant resin particles tended to have a smaller number average primary particle diameter with an increase in rotational speed of the stirring impeller. Each type of the resin particles SA-1 to SA-5 and SB-1 to SB-4 was substantially made from a cross-linked styrene-acrylic acid-based resin. The resultant resin particles SA-1 to SA-5 and SB-1 to SB-4 were directly used in a later external addition process without being washed.

[Toner Production]

(Shell Layer Formation Process)

A 2-L three-necked flask equipped with a thermometer and a stirring impeller was provided and set up in a water bath. Subsequently, 300 mL of ion exchanged water was added into the flask and the internal temperature of the flask was kept at 30° C. using the water bath. Next, the pH of the flask contents was adjusted to 4 by adding dilute hydrochloric acid into the flask.

Subsequently, 220 g of a shell material (the resin fine particle suspension prepared according to the method described above) was added into the flask and 300 g of toner cores shown in Table 1 (one type of the toner cores M-1 to M-3 prepared according to the method described above) were further added into the flask. The toner cores M-2 were added in production of the toner TA-2. The toner cores M-3 were added in production of the toner TA-7. The toner cores M-1 were added in production of each of the other toners.

Subsequently, the flask contents were stirred for one hour under conditions of a rotational speed of 200 rpm and a temperature of 30° C. Next, 300 mL of ion exchanged water was added into the flask and the internal temperature of the flask was increased up to 70° C. at a rate of 1.0° C./minute while the flask contents were stirred at a rotational speed of 100 rpm (by the stirring impeller). The flask contents were then stirred for two hours under conditions of a temperature of 70° C. and a rotational speed of 100 rpm (by the stirring impeller). Through the above, a dispersion of toner mother particles prior to later-described mechanical treatment (also referred to below as pre-treatment particles) was obtained. Thereafter, the pH of the dispersion of the pre-treatment particles was adjusted to 7 (neutralization) using sodium hydroxide and the dispersion of the pre-treatment particles was cooled to normal temperature (approximately 25° C.).

(Washing Process)

The dispersion of the pre-treatment particles obtained as described above was filtered (solid-liquid separation) using a Buchner funnel. As a result, a wet cake of the pre-treatment particles was collected. The collected wet cake of the pre-treatment particles was re-dispersed in ion exchanged water. Dispersion and filtration were repeated five times in total for washing the pre-treatment particles.

(Drying Process)

Subsequently, the washed pre-treatment particles were dispersed in an aqueous ethanol solution at a concentration of 50% by mass to obtain a slurry of the pre-treatment particles. The pre-treatment particles in the slurry were dried using a continuous surface-modifying apparatus ("COAT-MIZER (registered Japanese trademark)" product of Freund Corporation) under conditions of a hot wind temperature of 45° C. and a flow rate of 2 m$^3$/minute. As a result, dried pre-treatment particles were obtained.

(Mechanical Treatment)

Mechanical treatment (specifically, treatment to apply shear force) was performed on the pre-treatment particles for ten minutes using a flow mixer ("FM-20C/I" produced by Nippon Coke & Engineering Co., Ltd.) under conditions of a rotational speed of 3,000 rpm and a jacket temperature of 20° C. When physical force was applied to the resin particles present on the surfaces of the toner cores, the resin particles that received the physical force were deformed and connected together by physical force. A mass of the resin particles on the surfaces of the toner cores was formed into films by the mechanical treatment with a result that resin films constituted by the resin particles (styrene-acrylic acid-based resin particles) having a number average roundness of at least 0.55 and no greater than 0.75 were formed. Toner mother particles were obtained through the mechanical treatment on the pre-treatment particles.

(External Addition Process)

The toner mother particles obtained as described above were loaded into an FM mixer ("FM-10B" product of Nippon Coke & Engineering Co., Ltd.). First external addition, second external addition, and third external addition shown in Table 2 were performed using the FM mixer under conditions of a rotational speed of 3,000 rpm and a jacket temperature of 20° C. As shown in Table 2, all of the first external addition, the second external addition, and the third external addition were performed in production of each type of the toners TB-3 and TB-7. Only the first external addition was performed in production of each type of the toners TB-1 and TB-5. The first external addition and the second external addition were performed in production of each type of the other toners. In each of the first external addition, the second external addition, and the third external addition, external additive(s) of corresponding type(s) in corresponding amount(s) shown in Tables 1 and 2 was/were loaded and mixed for a corresponding one of time periods shown under respective "Mixing period" in Table 2.

In production of for example the toner TA-1, 100 parts by mass of the toner mother particles and 0.7 parts by mass of the resin particles SA-1 were mixed together for ten minutes using the FM mixer ("FM-10B" product of Nippon Coke & Engineering Co., Ltd.). Subsequently, 0.7 parts by mass of the resin particles SB-1, 1.2 parts by mass of the hydrophobic silica particles (RA-200H), and 1.5 parts by mass of the conductive titanium oxide particles (EC-100) were further loaded into the FM mixer and the contents of the FM mixer (the toner mother particles to which the resin particles SA-1 had adhered, the resin particles SB-1, the hydrophobic silica particles, and the conductive titanium oxide particles) were mixed together for additional five minutes.

In production of the toner TB-1, 100 parts by mass of the toner mother particles, 1.4 parts by mass of the resin particles SB-1, 1.2 parts by mass of the hydrophobic silica particles (RA-200H), and 1.5 parts by mass of the conductive titanium oxide particles (EC-100) were mixed together for five minutes using the FM mixer ("FM-10B" product of Nippon Coke & Engineering Co., Ltd.).

In production of the toner TB-3, 100 parts by mass of the toner mother particles and 0.7 parts by mass of the resin particles SA-1 were mixed together for eight minutes using the FM mixer ("FM-10B" product of Nippon Coke & Engineering Co., Ltd.). Subsequently, 1.2 parts by mass of the hydrophobic silica particles (RA-200H) and 1.5 parts by mass of the conductive titanium oxide particles (EC-100) were further loaded into the FM mixer and the contents of the FM mixer (the toner mother particles to which the resin particles SA-1 had adhered, the hydrophobic silica particles, and the conductive titanium oxide particles) were mixed together for additional three minutes. Next, 0.7 parts by mass of the resin particles SB-1 were additionally loaded into the FM mixer and the contents of the FM mixer (the resin particles SB-1 and the toner mother particles to which the resin particles SA-1, the hydrophobic silica particles, and the conductive titanium oxide particles had adhered) were mixed together for additional two minutes.

Through the above external addition process, the external additive adhered to the surfaces of the toner mother particles. Thereafter, sifting was performed using a 200 mesh sieve (pore size 75 μm). As a result, a toner (each of the toners TA-1 to TA-7 and TB-1 to TB-9) including multiple toner particles was produced.

With respect to each of the toners obtained as described above, a toner melting temperature, a detachment ratio of the resin particles $R_A$, and a detachment ratio of the resin particles $R_B$ were measured, results of which were as shown in Table 4.

TABLE 4

| Toner | Detachment ratio of external additive [%] | | Toner melting temperature [° C.] |
|---|---|---|---|
| | Resin particles $R_A$ | Resin particles $R_B$ | |
| TA-1 | 13 | 50 | 81.0 |
| TA-2 | 6 | 35 | 78.0 |
| TA-3 | 15 | 47 | 81.0 |
| TA-4 | 10 | 40 | 81.2 |
| TA-5 | 19 | 31 | 80.8 |
| TA-6 | 17 | 52 | 81.0 |
| TA-7 | 17 | 51 | 87.0 |
| TB-1 | 35 | — | 80.5 |
| TB-2 | 20 | — | 80.8 |
| TB-3 | 15 | 69 | 80.9 |
| TB-4 | 15 | 10 | 81.0 |
| TB-5 | 48 | 49 | 80.4 |
| TB-6 | 13 | 31 | 80.5 |
| TB-7 | 8 | 59 | 81.0 |
| TB-8 | 5 | 42 | 80.5 |
| TB-9 | 40 | 47 | 81.0 |

With respect to for example the toner TA-1: the toner melting temperature (specifically, a temperature at which the melt viscosity of the toner reached $1.0 \times 10^5$ Pa·s) was 81.0° C.; the detachment ratio of the resin particles $R_A$ (specifically, a peak intensity percentage indicating a detachment ratio of the resin particles $R_A$ in a fluorescent X-ray spectrum plotted for a dispersion of the toner subjected to ultrasonic treatment for five minutes) was 13%; and the detachment ratio of the resin particles $R_B$ (specifically, a peak intensity percentage indicating a detachment ratio of the resin particles $R_B$ in a fluorescent X-ray spectrum plotted for the dispersion of the toner subjected to ultrasonic treatment for five minutes) was 50%. The measuring methods thereof were as described below.

<Method for Measuring Toner Melting Temperature>

A cylindrical molded sample having a diameter of 1 cm and a volume of 1 cm³ was formed by pressure-molding 1.8 g of a toner (measurement target: one of the toners TA-1 to TA-7 and TB-1 to TB-9) at a pressure of 10 MPa. Subsequently, the molded sample was set up into a capillary rheometer ("CFT-500D" product of Shimadzu Corporation). The molded sample of the toner was caused to melt in a normal-temperature and normal-humidity (temperature: 23° C.±5° C., relative humidity: 50%±10%) environment using the capillary rheometer under the following conditions. The temperature at which the melt viscosity of the melting and flowing toner reached $1.0 \times 10^5$ Pa·s (that is, the toner melting temperature) was measured.

(Measurement Conditions)
Plunger load: 20 kg/cm².
Die pore diameter: 1 mm.
Die length: 1 mm.
Heating rate: 4° C./minute.
Pre-heating period: 5 minutes.

<Method for Measuring Respective Detachment Ratios of Resin Particles $R_A$ and Resin Particles $R_B$>

Respective detachment ratios of the resin particles $R_A$ and the resin particles $R_B$ were measured for a toner dispersion subjected to five-minute ultrasonic treatment. Specifically, the toner dispersion after the ultrasonic treatment was filtered to collect a toner and fluorescent X-ray analysis was performed on the collected toner (also referred to below as a "post-ultrasonic treatment toner") to plot a fluorescent X-ray spectrum. Besides the post-ultrasonic treatment toner, the fluorescent X-ray analysis was also performed on the toner before subjected to the ultrasonic treatment (also referred to below as an "initial toner") to plot a fluorescent X-ray spectrum. Respective detachment ratios of the resin particles $R_A$ and the resin particles $R_B$ were determined by comparison between the fluorescent X-ray spectrum of the post-ultrasonic treatment toner and that of the initial toner. The ultrasonic treatment, the fluorescent X-ray analysis, and a method for calculating each detachment ratio were as described below.

(Ultrasonic Treatment)

The toner dispersion was obtained by mixing 0.2 g of a nonionic surfactant ("EMULGEN (registered Japanese trademark) 120" product of Kao Corporation, component: polyoxyethylene lauryl ether), 80 g of ion exchanged water, and 20 g of a toner (measurement target: one of the toners TA-1 to TA-7 and TB-1 to TB-9) together. Subsequently, the ultrasonic treatment was performed on the resultant toner dispersion for five minutes using a ultrasonic disperser ("Ultrasonic Mini Welder P128" product of Ultrasonic Engineering Co., Ltd., output: 100 W, oscillation frequency: 28 kHz). Subsequently, the toner dispersion subjected to the ultrasonic treatment as above was vacuum-filtered using a Buchner funnel. Thereafter, reslurry by adding ion exchanged water and vacuum filtration were repeated five times to wash the toner. The surfactant (cationic surfactant, anionic surfactant, or nonionic surfactant) present on the surfaces of the resin particles (external additive) remained even after the washing. Thereafter, heating treatment was performed on the toner to dry the toner, thereby obtaining a post-ultrasonic treatment toner.

(Fluorescent X-ray Analysis)

Each of the post-ultrasonic treatment toner and the initial toner was used as a measurement target. A cylindrical pellet having a diameter of 30 mm was formed by pressure-molding 1.5 g of a toner, which was the measurement target, at a pressure of 20 MPa for a pressure application period of three seconds. Subsequently, fluorescent X-ray analysis was performed on the resultant pellet to plot a fluorescent X-ray spectrum (horizontal axis: energy, vertical axis: intensity (number of photons) having a peak originating from a detection target (specific element). The detection target was an element distinctive in a target external additive. In an example, the fluorescent X-ray analysis was performed under the following conditions with N being the detection target with respect to the resin particles having surfaces to which the cationic surfactant (cetyltrimethylammonium chloride) adhered. In another example, the fluorescent X-ray analysis was performed under the following conditions with S being the detection target with respect to the resin particles having surfaces to which the anionic surfactant (sodium lauryl sulfate) adhered.

Analysis device: fluorescent X-ray analysis device ("ZSX Primus IV" product of Rigaku Corporation).
Spectroscopic crystal: RX35 or RX45.
Measurement target element: N or S.

(Method for Calculating Detachment Ratio of Resin Particles)

The detachment ratio of resin particles (an external additive) was calculated based on the fluorescent X-ray spectrum plotted for each of the post-ultrasonic treatment toner and the initial toner by fluorescent X-ray analysis. Specifically, a detachment ratio $X_T$ of a target external additive (the resin particles $R_A$ or $R_B$) was calculated from a peak intensity $X_A$ originating from the resin particles (target external additive) included in the post-ultrasonic treatment toner and a peak intensity $X_B$ originating from the resin particles (target external additive) included in the initial toner in accordance with an equation "$X_T = 100 \times (X_B - X_A)/X_B$".

[Evaluation Methods]

Samples (toners TA-1 to TA-7 and TB-1 to TB-9) were evaluated by the following methods.

(Preparation of Evaluation Developer)

An evaluation developer (two-component developer) was prepared by mixing 100 parts by mass of a developer carrier (carrier for "TASKalfa5550ci" product of KYOCERA Document Solutions Inc.) and 10 parts by mass of a toner (evaluation target: one of the toners TA-1 to TA-7 and TB-1 to TB-9) together for 30 minutes using a ball mill. Thermal-stress resistance, lowest fixing temperature, transfer efficiency, charge maintainability after thermal treatment, and charge maintainability after a printing durability test were evaluated by methods described below using the resultant evaluation developer.

(Thermal-Stress Resistance)

The evaluation developer (two-component developer) prepared as described above was loaded into a developing device taken out from a multifunction peripheral ("TASKalfa 500ci" product of KYOCERA Document Solutions Inc.). The developing device was left to stand for one hour in a thermostatic chamber set at 50° C. Thereafter, the developing device taken out from the thermostatic chamber was driven by an external motor for one hour for aging. The developing device was driven under the same condition (specifically, rotational speed) as that when driven in the multifunction peripheral (TASKalfa 500ci).

After the aging, the developer (two-component developer) was taken out from the developing device. Next, 10 g of the taken developer was placed on a 200 mesh sieve (pore size 75 μm) of a known mass. A mass of the sieve on which the developer was placed was measured to obtain a mass of the developer on the sieve (mass of the developer before sifting). Subsequently, the sieve was placed in a powder property evaluation device ("POWDER TESTER (registered Japanese trademark)" product of Hosokawa Micron Corporation) and sifted in accordance with a manual of the powder property evaluation device by shaking the sieve for 60 seconds at a rheostat level of 5. A mass of developer remaining on the sieve (mass of developer after sifting) was calculated through measurement of a mass of the sieve including the developer remaining on the sieve after the sifting. The aggregation rate (unit: % by mass) of the developer was calculated in accordance with the following equation.

Aggregation rate (unit: % by mass)=100×(mass of developer after sifting)/(mass of developer before sifting)

Thermal-stress resistance was evaluated as good when the aggregation rate was no greater than 2.0% by mass. Thermal-stress resistance was evaluated as poor when the aggregation rate was greater than 2.0% by mass.

(Lowest Fixing Temperature)

An evaluation apparatus used was a printer (evaluation apparatus obtained by modifying "FS-C5250DN" (product of KYOCERA Document Solutions Inc.) to enable adjustment of fixing temperature) having a roller-roller type heat-pressure fixing device (nip width: 8 mm). The evaluation developer (two-component developer) prepared as described above was loaded into a developing device of the evaluation apparatus and a toner for replenishment use (evaluation target: a corresponding one of the toners TA-1 to TA-7 and TB-1 to TB-9) was loaded into a toner container of the evaluation apparatus.

A solid image (specifically, unfixed toner image) having a size of 25 mm×25 mm was formed on paper (A4-size printing paper) having a basis weight of 90 g/m² in an environment at a temperature of 25° C. and a relative humidity of 50% using the evaluation apparatus under conditions of a linear velocity of 200 mm/second and a toner application amount of 1.0 mg/cm². Subsequently, the paper with the image formed thereon was passed through the fixing device of the evaluation apparatus. The transit time of the paper through a nip of the fixing device was 40 ms.

The fixing temperature was set within a range from 100° C. to 200° C. Specifically, the fixing temperature of the fixing device was increased from 100° C. in increments of 5° C. and whether or not the solid image (toner image) could be fixed to the paper was determined at each fixing temperature.

Whether or not the toner could be fixed was confirmed by a fold-rubbing test such as described below. Specifically, evaluation paper having passed through the fixing device was folded in half with a surface with the image formed thereon facing inward and a 1-kg weight covered with cloth was rubbed back and forth on a fold five times. Next, the paper was opened up and a fold portion (i.e., a portion at which the solid image was formed) of the paper was observed. The length of toner peeling of the fold portion (peeling length) was measured. The minimum fixing temperature was determined to be a lowest temperature among fixing temperatures for which the peeling length was less than 1 mm. Lower fixing temperature indicates more excellent low-temperature fixability of the toner. The lowest fixing temperatures determined as above were as shown in Table 5.

(Transfer Efficiency)

The evaluation developer prepared as described above was loaded into a multifunction peripheral ("TASKalfa5550ci" product of KYOCERA Document Solutions Inc.), and an image having a coverage rate of 5% was output on 10,000 sheets of paper using the multifunction peripheral while the multifunction peripheral was replenished with a toner for replenishment use (evaluation target: a corresponding one of the toners TA-1 to TA-7 and TB-1 to TB-9) in an environment at a temperature of 32.5° C. and a relative humidity of 80%. A transfer efficiency (unit: %) was calculated from the respective measured masses of consumed toner and collected toner in accordance with the following equation. The consumed toner is a portion of a sample (toner) loaded into the toner container that was ejected from the toner container. The collected toner is a portion of the consumed toner that was not transferred to the paper.

Transfer efficiency=100×((mass of consumed toner)−(mass of collected toner))/(mass of consumed toner)

A transfer efficiency of at least 90% by mass was evaluated as "good". A transfer efficiency of less than 90% by mass was evaluated as "poor".

(Charge Maintainability After Thermal Treatment)

The charge amount (unit: µC/g) of the toner contained in the evaluation developer was measured using a Q/m meter ("MODEL 210HS" product of TREK, INC.) directly after the evaluation developer was prepared in accordance with the method as described above. The charge amount measured at that time is referred to below as an "initial charge amount $E_A$" (or simply "$E_A$").

A toner (evaluation target: one of the toners TA-1 to TA-7 and TB-1 to TB-9) was left to stand for 24 hours in an environment at a temperature of 45° C. and a relative humidity of 20%. Thereafter, 10 parts by mass of the toner and 100 parts by mass of a developer carrier (carrier for "TASKalfa5550ci" product of KYOCERA Document Solutions Inc.) were mixed together for 30 minutes using a ball mill to obtain a two-component developer. The charge amount (unit: µC/g) of the toner contained in the resultant two-component developer was measured using a Q/m meter ("MODEL 210HS" product of TREK, INC.). The charge amount measured at that time is referred to below as a "post-thermal treatment charge amount $E_B$" (or simply "$E_B$").

A charge maintainability (unit: %) after the thermal treatment was calculated from the initial charge amount $E_A$ and the post-thermal treatment charge amount $E_B$ measured as above in accordance with the following equation.

Charge maintainability after thermal treatment=100×$E_B/E_A$

A charge maintainability after the thermal treatment of at least 90% and no greater than 110% was evaluated as "good". A charge maintainability after the thermal treatment of less than 90% or greater than 110% was evaluated as "poor".

(Charge Maintainability After Printing Durability Test)

The charge amount (unit: µC/g) of the toner contained in the evaluation developer was measured using a Q/m meter ("MODEL 210HS" product of TREK, INC.) directly after the evaluation developer was prepared in accordance with the method as described above. The charge amount measured at that time is referred to below as an "initial charge amount $E_C$" (or simply "$E_C$").

The evaluation developer prepared in accordance with the above-described method was loaded into a multifunction peripheral ("TASKalfa 500ci" product of KYOCERA Document Solutions Inc.). An image having a coverage rate of 20% was output on 3,000 sheets of paper using the multifunction peripheral while the multifunction peripheral was replenished with a toner for replenishment use (evaluation target: a corresponding one of the toners TA-1 to TA-7 and TB-1 to TB-9) in an environment at a temperature of 10° C. and a relative humidity of 10%. Thereafter, the two-component developer was taken out from a developing device taken out from the multifunction peripheral. The charge amount (unit: μC/g) of toner contained in the taken two-component developer was measured using a Q/m meter ("MODEL 210HS" product of TREK, INC.). The charge amount measured at that time is referred to below as a "post-printing charge amount $E_D$" (or simply "$E_D$").

A charge maintainability (unit: %) after printing was calculated from the initial charge amount $E_C$ and the post-printing charge amount $E_D$ measured as above in accordance with the following equation.

$$\text{Charge maintainability after printing} = 100 \times E_D/E_C$$

A charge maintainability after printing of at least 50% was evaluated as "good". A charge maintainability after printing of less than 50% was evaluated as "poor". In evaluation for each of the toners TA-1 to TA-7 and TB-1 to TB-9, the charge maintainability after printing was no greater than 100%.

[Evaluation Results]

Thermal-stress resistance, lowest fixing temperature, transfer efficiency, and each charge maintainability (after printing and after thermal treatment) were evaluated for each of the toners TA-1 to TA-7 and TB-1 to TB-9, of which evaluation results are shown in Table 5.

TABLE 5

|  |  | Charge maintainability [%] | | Thermal-stress resistance [% by mass] | Transfer efficiency [% by mass] | Fix-ability [° C.] |
|---|---|---|---|---|---|---|
|  | Toner | After printing | After thermal Treatment |  |  |  |
| Example 1 | TA-1 | 78 | 95 | 1.0 | 92 | 140 |
| Example 2 | TA-2 | 86 | 91 | 1.8 | 90 | 130 |
| Example 3 | TA-3 | 72 | 98 | 1.2 | 91 | 140 |
| Example 4 | TA-4 | 85 | 90 | 1.1 | 90 | 140 |
| Example 5 | TA-5 | 75 | 92 | 1.2 | 90 | 140 |
| Example 6 | TA-6 | 77 | 93 | 1.2 | 90 | 140 |
| Example 7 | TA-7 | 73 | 99 | 0.8 | 92 | 160 |
| Comparative Example 1 | TB-1 | 90 | 85 | 1.1 | 91 | 140 |
| Comparative Example 2 | TB-2 | 43 | 102 | 1.0 | 85 | 140 |
| Comparative Example 3 | TB-3 | 82 | 87 | 1.0 | 94 | 140 |
| Comparative Example 4 | TB-4 | 90 | 93 | 2.1 | 76 | 140 |
| Comparative Example 5 | TB-5 | 49 | 101 | 1.0 | 93 | 140 |
| Comparative Example 6 | TB-6 | 78 | 92 | 2.6 | 93 | 140 |
| Comparative Example 7 | TB-7 | 73 | 89 | 1.2 | 86 | 140 |
| Comparative Example 8 | TB-8 | 85 | 86 | 2.6 | 93 | 140 |
| Comparative Example 9 | TB-9 | 40 | 92 | 1.4 | 87 | 140 |

The toners TA-1 to TA-7 (toners of Examples 1 to 7) were positively chargeable toners having the aforementioned basic features. Specifically, each of the toners TA-1 to TA-7 included a plurality of toner particles each including a toner mother particle and an external additive adhering to the surface of the toner mother particle. The external additive included the first resin particles (specifically, first resin particles having surfaces to which a cationic surfactant adhered) and the second resin particles (specifically, second resin particles having surfaces to which an anionic surfactant adhered) (see Tables 1 and 3). The respective number average primary particle diameters of the first resin particles and the second resin particles were at least 60 nm and no greater than 100 nm (see Tables 1 and 3). The first resin particles in a dispersion of the toner subjected to the five-minute ultrasonic treatment had a detachment ratio of no greater than 20% in terms of a peak intensity percentage on a fluorescent X-ray spectrum plotted for the dispersion of the toner and the second resin particles in the dispersion subjected to the five-minute ultrasonic treatment had a detachment ratio of at least 30% and no greater than 60% in terms of a peak intensity percentage on a fluorescent X-ray spectrum plotted for the dispersion of the toner (see Table 4).

As shown in Table 5, toner scattering could be inhibited with favorable chargeability maintained in continuous printing when any of the toners TA-1 to TA-7 was used.

What is claimed is:

1. A positively chargeable toner comprising a plurality of toner particles each including a toner mother particle and an external additive adhering to a surface of the toner mother particle, wherein
    the external additive includes first resin particles having surfaces to which a cationic surfactant adheres and second resin particles having surfaces to which an anionic surfactant adheres,
    respective number average primary particle diameters of the first resin particles and the second resin particles are at least 60 nm and no greater than 100 nm,
    a detachment ratio of the first resin particles in a dispersion of the positively chargeable toner subjected to five-minute ultrasonic treatment is no greater than 20% in terms of a peak intensity percentage in a fluorescent X-ray spectrum plotted for the dispersion of the positively chargeable toner, and
    a detachment ratio of the second resin particles in the dispersion of the positively chargeable toner subjected to the five-minute ultrasonic treatment is at least 30% and no greater than 60% in terms of a peak intensity percentage in a fluorescent X-ray spectrum plotted for the dispersion of the positively chargeable toner.

2. The positively chargeable toner according to claim 1, wherein
    the anionic surfactant is an anionic surfactant substituted by a sulfate anion group or a sulfonate anion group, and
    the cationic surfactant is a nitrogen atom-containing cationic surfactant.

3. The positively chargeable toner according to claim 1, wherein
    the anionic surfactant is at least one surfactant selected from the group consisting of alkylsulfuric acid ester salts substituted by an alkyl group having a carbon number of at least 10 and no greater than 25 and straight-chain alkylbenzenesulfonic acid salts substituted by a straight-chain alkyl group having a carbon number of at least 10 and no greater than 25, and
    the cationic surfactant is at least one surfactant selected from the group consisting of alkyl trimethyl ammonium salts substituted by an alkyl group having a carbon number of at least 10 and no greater than 25 and alkylamine acetates substituted by an alkyl group having a carbon number of at least 10 and no greater than 25.

4. The positively chargeable toner according to claim 1, wherein
a nonionic surfactant additionally adheres to either or both the surfaces of the first resin particles and the surfaces of the second resin particles.

5. The positively chargeable toner according to claim 1, wherein
both the first resin particles and the second resin particles contain a cross-linked styrene-acrylic acid-based resin, and
the cross-linked styrene-acrylic acid-based resin contained in the first resin particles and the cross-linked styrene-acrylic acid-based resin contained in the second resin particles are constituted by the same type of monomer and the same type of cross-linking agent as each other.

6. The positively chargeable toner according to claim 1, wherein
both the first resin particles and the second resin particles contain a polymer of monomers including (meth) acrylic acid alkyl ester having an ester moiety substituted by an alkyl group having a carbon number of at least 1 and no greater than 4, a styrene-based monomer, and a cross-linking agent having at least two unsaturated bonds.

7. The positively chargeable toner according to claim 1, wherein
the first resin particles are secured to the surface of the toner mother particle predominantly by mechanical connecting force through embedment, and
the second resin particles are secured to the surface of the toner mother particle predominantly by Van der Waals force or electrostatic force.

8. The positively chargeable toner according to claim 7, wherein
inorganic particles having surfaces to which no surfactant adheres adhere to the surface of the toner mother particle in addition to the first resin particles and the second resin particles,
the inorganic particles include either or both hydrophobic silica particles and conductive titanium oxide particles, and
the inorganic particles are secured to the surface of the toner mother particle predominantly by Van der Waals force or electrostatic force.

9. The positively chargeable toner according to claim 1, wherein
the toner mother particle includes a core and a shell layer disposed on a surface of the core,
the shell layer includes a resin film mainly constituted by a mass of resin particles having a glass transition point of at least 50° C. and no greater than 100° C.,
the resin particles forming the resin film have a number average roundness of at least 0.55 and no greater than 0.75,
the resin particles of the shell layer contain a resin including at least one repeating unit derived from a styrene-based monomer, at least one repeating unit substituted by an alcoholic hydroxyl group, and at least one repeating unit derived from a nitrogen atom-containing vinyl compound, and
the repeating unit derived from the styrene-based monomer has the highest mass ratio among repeating units included in the resin contained in the resin particles.

10. The positively chargeable toner according to claim 9, wherein
the core contains a polyester resin having an acid value of at least 20 mgKOH/g and no greater than 60 mgKOH/g, a hydroxyl value of at least 20 mgKOH/g and no greater than 60 mgKOH/g, a glass transition point of at least 40° C. and no greater than 55° C., and a softening point of at least 80° C. and no greater than 100° C., and
the polyester resin contains bisphenol as an alcohol component.

11. The positively chargeable toner according to claim 1, wherein
a temperature at which a melt viscosity of the positively chargeable toner measured by a flow tester reaches $1.0 \times 10^5$ Pa·s is at least 77.5° C. and no greater than 82.5° C.

* * * * *